(12) United States Patent
Rosen et al.

(10) Patent No.: US 8,612,328 B2
(45) Date of Patent: Dec. 17, 2013

(54) METHOD AND PLATFORM FOR FACILITATING COMPETITIVE VIRTUAL SECURITIES TRADING

(76) Inventors: Ori Rosen, Holon (IL); Eli Nhaissi, Old Westbury, NY (US)

( * ) Notice: Subject to any disclaimer, the term of this patent is extended or adjusted under 35 U.S.C. 154(b) by 1141 days.

(21) Appl. No.: 12/380,084

(22) Filed: Feb. 24, 2009

(65) Prior Publication Data

US 2009/0216685 A1 Aug. 27, 2009

Related U.S. Application Data

(60) Provisional application No. 61/067,206, filed on Feb. 25, 2008.

(51) Int. Cl.
*G06Q 40/00* (2012.01)

(52) U.S. Cl.
USPC .............................. 705/37; 705/35; 705/36 R

(58) Field of Classification Search
USPC ....................................................... 705/35–40
See application file for complete search history.

(56) References Cited

U.S. PATENT DOCUMENTS

| | | | | |
|---|---|---|---|---|
| 6,709,330 | B1 * | 3/2004 | Klein et al. | 463/9 |
| 6,773,350 | B2 | 8/2004 | Yoshimi et al. | |
| 2004/0098323 | A1 * | 5/2004 | Bowser | 705/35 |
| 2005/0090911 | A1 * | 4/2005 | Ingargiola et al. | 700/36 |
| 2006/0247056 | A1 | 11/2006 | Luckerson | |

FOREIGN PATENT DOCUMENTS

| | | |
|---|---|---|
| EP | 1175928 A2 * | 1/2004 |
| JP | 2003062336 | 3/2003 |
| WO | 2004040495 | 5/2004 |
| WO | 2006072942 | 7/2006 |

OTHER PUBLICATIONS

The Philadelphia Inquirer Web Winners column, Reid Kanale, Philadelphia Inquirer, Aug. 26, 2007.*
Betting Heavily on Internet Stocks Leads HedgeHog Competitor to Victory!, PR Newswire, Sep. 29, 1998.*

* cited by examiner

*Primary Examiner* — Olabode Akintola
*Assistant Examiner* — Kellie Campbell
(74) *Attorney, Agent, or Firm* — Ostrager Chong Flaherty & Broitman P.C.

(57) ABSTRACT

A method for providing a trading platform over the Internet or other network that allows users to participate in competitive virtual trading of securities and/or derivatives, wherein the monetary returns of the participants are based on their relative performances. All of the participants must register and deposit monies in an account with the trading platform provider. The platform provider will control the crediting and debiting of each account based on the results of each competition. In a competition, the securities and/or derivatives are traded at market prices, including but not limited to over-the-counter spot prices on different assets such as currencies, indices, commodities, stocks and exchange-traded funds (ETFs), but instead of calculating the returns of the participants according to their absolute results (which means the summation of gains and losses for all the transactions that the participant executed within a period of time), the returns of a participant will be based on the difference between his and his rival's absolute results.

22 Claims, 22 Drawing Sheets

Duel Exchange—Login...

Participant: ☐
Password: ☐
[Confirm] [New Account]

FIG.4

Duel Exchange—New Account

New Account

Participant: |ABC
Password: ******
Confirm Password: ******
First Name: ☐
Middle Name: ☐
Last Name: ☐
Phone No: ☐
Address: ☐
Email: ☐

[Confirm]

FIG.5

Duel Exchange—Login...

Participant: ABC

Password: ******

[ Confirm ] [ New Account ]

FIG.6

Duel Exchange—New Account

ABC, Welcome To Duel Exchange

[ My Account ]
[ My History ]
[ Start Trading ]
[ Deposit ]
[ Withdraw ]
[ Help ]

My Account:

Your Current Balance: 0.00 $

Last Deposit:

Last Withdrawal:

FIG.7

Duel Exchange
ABC, Welcome To Duel Exchange

- My Account
- My History
- Start Trading
- Deposit
- Withdraw
- Help

Deposit:
I wish to make a deposit to my account: [50,000.00 $]
In order to deposit funds you must enter Credit card details:
Credit Card Type: [ ▼ ]
Credit Card Number: [ ]
Card Holder's Name: [ ]
Expiration (mm/yyyy): [ ]
CVV2: [ ]     [Confirm]

FIG.8

Duel Exchange
ABC, Welcome To Duel Exchange

- My Account
- My History
- Start Trading
- Deposit
- Withdraw
- Help

Start Trading:
- ⊙ Create Standard Session
- ○ Join Standard Session
- ○ Create Initiated Session
- ○ Join Initiated Session

[Confirm]

FIG.9

| Duel Exchange–Create a Standard Session |
|---|

ABC, You are about to create a standard session

Maximum Amount of Risk: ○ 1000$  ○ 2000$  ○ 5000$  ⊙ 10000$

Trading Category:     ⊙ FOREX  ○ Commodities  ○ Indices  ○ Single Stocks  ○ All

Select Trading Asset:
| ALL |
|---|
| USD/JPY |
| EUR/USD |
| EUR/CHF |
| USD/ILS |
| GBP/NOK |

[Continue]

You decided to create a standard session with the following details:

Maximum amount of risk: 10,000$
Trading category: Forex
Trading assets: USD/JPY
Maximum transactions allowed: 10
Session ends at 12:00 AM GMT
Size of each transaction 100,000$
Session ends if you or the other participant decide to quit or
If your balance in the session reaches Zero or
If the difference between your balance in the session and the other participant's balance in the session reaches 10,000$ or
If both of you and the other participant closed 10 transactions.

In order to open the session, you need to wait until another participant joins the session.
The session will expire if no one joins within an hour.

☑ I Agree     ☐ Not Agree

FIG.10

Duel Exchange—Managing Session

Managing Standard Session

ABC,
02:30:25 hours left to end session.
You started the session with 10,000.00$.
You Opened 0 out of 10 allowed transactions
Your current balance in the session: 10,000.00$
The other participant Joe Opened 1 out of 10 transactions.
The balance of Joe in the session is 9,800.00$.
The difference in balance between you and Joe is +200.00$.

Trading assets: USD/JPY 99.80    [Buy]   [Sell]

Sell(Short)
You decided to sell 100,000$ USD/JPY AT 99.80
[Yes]  [No]

Your positions in the session:
| Time | Asset | Long/Short | Open Rate | Gain | Status |
|------|-------|------------|-----------|------|--------|

Joe's positions in the session:
| Time | Asset | Long/Short | Open Rate | Gain | Status |
|------|-------|------------|-----------|------|--------|
| 09/09/08 21:25:30 | USD/JPY | Long | 100.00 | -200.00$ | Open |

You Have No Open Positions, To Quit Session With 200.00$ Gain Click Here: [Quit Session]

Duel Exchange—Managing Session

Managing Standard Session

ABC,
02:29:20 hours left to end session.
You started the session with 10,000.00$.
You Opened 1 out of 10 allowed transactions
Your current balance in the session: 10,801.60$
The other participant Joe Opened 1 out of 10 transactions.
The balance of Joe in the session is 9,000.00$.
The difference in balance between you and Joe is +1,801.60$.

Trading assets: USD/JPY 99.00

[ Buy ]  [ Sell ]

Close Short
You decided to Close Short on 100,000$ USD/JPY AT 99.00
[ Yes ]  [ No ]

Your positions in the session:

| Time | Asset | Long/Short | Open Rate | Gain | Status |
|---|---|---|---|---|---|
| 09/09/08 21:29:37 | USD/JPY | Short | 99.80 | 801.60$ | Open |

[ Close ]

Joe's positions in the session:

| Time | Asset | Long/Short | Open Rate | Gain | Status |
|---|---|---|---|---|---|
| 09/09/08 21:25:30 | USD/JPY | Long | 100.00 | -1,000.00$ | Open |

You Have Open Positions, You Can't Quit Session !

☐ Duel Exchange—Managing Session                                      ☒

Managing Standard Session

ABC,
02:21:22 hours left to end session.
You started the session with 10,000.00$.
You Opened 1 out of 10 allowed transactions
Your current balance in the session: 10,801.60$
The other participant Joe Opened 1 out of 10 transactions.
The balance of Joe in the session is 8,500.00$.
The difference in balance between you and Joe is +2,301.60$ Trading assets: USD/JPY 98.50    [Buy]   [Sell]

Your positions in the session:

| Time | Asset | Long/Short | Open Rate | Gain | Status |
|---|---|---|---|---|---|
| 09/09/08 21:29:37 | USD/JPY | Short | 99.80 | 801.60$ | Close |

Joe's positions in the session:

| Time | Asset | Long/Short | Open Rate | Gain | Status |
|---|---|---|---|---|---|
| 09/09/08 21:25:30 | USD/JPY | Long | 100.00 | -1,500.00$ | Open |

You Have No Open Positions, To Quit Session With 2,301.60$ Gain Click Here: [Quit Session]

```
Duel Exchange—Confirm Initiated Session
```
You decided to create an initiated session with the following details:
Maximum amount of risk: 2,000$
Trading category: Indices, Single Stocks
Trading assets: ^GSPC, INTC
Maximum transactions allowed: 3
Session ends at 21:00 GMT, Today
Leverage: 50
Size of each transaction 100,000$
Session ends if you or the other participant decide to quit or
If your balance in the session reaches Zero or
If the difference between your balance in the session and the other participant's balance in the session reaches 2,000$ or
If both of you and the other participant closed 3 transactions.
In order to open the session, you need to wait until another participant joins the session.
The session will expire if no one joins within an hour.

☑ I Agree     ☐ Not Agree

FIG.21

```
Duel Exchange
```
Shark, Welcome To Duel Exchange

| My Account | Start Trading: |
| My History | ○ Create Standard Session |
| Start Trading | ○ Join Standard Session |
| Deposit | ○ Create Initiated Session |
| Withdraw | ⊙ Join Initiated Session |
| Help | Confirm |

FIG.22

Duel Exchange—Managing Session

Managing Initiated Session

ABC,
00:30:25 hours left to end session.
You started the session with 2,000.00$.
You Opened 0 out of 3 allowed transactions
Your current balance in the session: 2,000.00$
The other participant Shark Opened 1 out of 3 transactions.
The balance of Shark in the session is 1,500.00$.
The difference in balance between you and Shark is +500.00$.

Trading assets: ^GSPC 1230.00 [Buy] [Sell]
INTC 20.10 [Buy] [Sell]

Buy (Long)
? You decided to buy 100,000$
of ^GSPC AT 1230.00
[Yes] [No]

Your positions in the session:
| Time | Asset | Long/Short | Open Rate | Gain | Status |
|------|-------|------------|-----------|------|--------|

Shark's positions in the session:
| Time | Asset | Long/Short | Open Rate | Gain | Status |
|------|-------|------------|-----------|------|--------|
| 10/09/08 20:29:00 | INTC | Short | 20.00 | -500.00$ | Open |

You Have No Open Positions, To Quit Session With 500.00$ Gain Click Here: [Quit Session]

Duel Exchange—Managing Session

Managing Initiated Session

ABC,
00:28:35 hours left to end session.
You started the session with 2,000.00$.
You Opened 2 out of 3 allowed transactions
Your current balance in the session: 2,603.34$
The other participant Shark Opened 1 out of 3 transactions.
The balance of Shark in the session is 600.00$.
The difference in balance between you and Shark is above 2,000.00$ which is the maximum amount of risk.
Session Is Stopping ...

Trading assets:  ^GSPC  1232.55   | Buy | Sell |
                 INTC   20.28     | Buy | Sell |

Your positions in the session:

| Time | Asset | Long/Short | Open Rate | Gain | Status |
|---|---|---|---|---|---|
| 10/09/08 20:29:38 | ^GSPC | Long | 1,230.00 | 207.31$ | Open |
| 10/09/08 20:30:25 | INTC | Long | 20.20 | 396.03$ | Open |

Shark's positions in the session:

| Time | Asset | Long/Short | Open Rate | Gain | Status |
|---|---|---|---|---|---|
| 10/09/08 20:29:00 | INTC | Short | 20.00 | -1,400.00$ | Open |

[Close]

METHOD AND PLATFORM FOR FACILITATING COMPETITIVE VIRTUAL SECURITIES TRADING

RELATED PATENT APPLICATION

This application claims the benefit, under Title 35, United States Code, §119(e), of U.S. Provisional Application Ser. No. 61/067,206 filed on Feb. 25, 2008.

BACKGROUND OF THE INVENTION

The invention disclosed herein generally relates to methods and systems for facilitating competitive virtual trading of securities and/or derivatives.

Currently traders can trade on a variety of exchanges. Traders can buy and sell securities like stocks, bonds, shares of mutual funds, and shares of exchange-traded funds (ETFs), and also can make transactions involving derivatives based on indices, commodities, currencies, and stocks. In many exchanges (like the New York Stock Exchange (NYSE), Nasdaq, Chicago Mercantile Exchange (CME), Euronext, etc.) the trader pays a commission for each transaction. When a trader trades derivatives (like options and futures), the asset is limited in time. In foreign currency platforms, traders execute leveraged transactions on pairs of currencies (spots, forwards and options). The bid and ask quotes arrive from interbank rates and also from information agencies like Reuters and Bloomberg. The trader pays the spread between the bid and ask prices for the asset.

The returns of traders are determined as a function of the absolute results of their transactions. A trader who bought one future contract on the S&P 500 Index through the CME will gain money if the S&P 500 Index rises and, conversely, will lose money if the index fails. The results of the trader will depend on the buying and selling prices of the asset at the respective times when his buy and sell orders were executed, his leverage, and the costs of the transactions. If the trader correctly anticipated a rise in the asset price, he will have a gain on the closing transaction, but if, contrary to his expectation, the price of the purchased asset decreased, the trader will lose money. In the commercial marketplace, the returns of a trader are based on his absolute results against the whole market. The trader executes transactions against other traders who need not be identified to the trader or his broker.

Today a trader cannot compete against the performance of selected other traders on a daily basis and the returns are calculated according to the success of his transactions versus all market participants. Some Internet betting sites enable participants to bet against each other (and not just against the house) on a specific bet (like which NBA basketball team will win in a specific game, or to bet if a financial index such as the Dow Jones Industrial Average will be higher than a certain threshold X on a specific day), but those sites do not enable participants to compete one against each other on a wider basis (such as executing multiple transactions within a defined time period).

There is a need for a system that would enable traders to compete against each other by executing multiple virtual asset transactions within a defined time period, each participant having the same amount of credit at risk for trading at the time when the competition begins and the winnings being allocated at the end of the competition as a function of the respective trading results of the participants.

BRIEF DESCRIPTION OF THE INVENTION

The present invention is directed to a method and a platform for facilitating competitive virtual trading of securities and/or derivatives over the Internet or other network, wherein the monetary returns of the participants are based on their relative performances. All of the participants must register and deposit monies in an account with the trading platform provider. The platform provider will control the crediting and debiting of each account based on the results of each competition. In a competition, the securities and/or derivatives are traded at market prices, including but not limited to over-the-counter spot prices on different assets such as currencies, indices, commodities, stocks and exchange-traded funds (ETFs), but instead of calculating the returns of the participants according to their absolute results (which means the summation of gains and losses for all the transactions that the participant executed within a period of time), the returns of a participant will be based on the difference between his and his rival's absolute results.

One aspect of the invention is a method for facilitating competitive virtual trading of assets comprising the following steps: (a) storing first and second monetary values in respective first and second trading accounts of first and second participants, the first and second monetary values representing respective amounts of money deposited by the first and second participants; (b) setting a risk parameter for a trading session, the risk parameter being a third monetary value representing a maximum amount of money that will be risked by each of the first and second participants during the trading session, the third monetary value being less than or equal to each of the first and second monetary values; (c) determining a current price for each asset eligible to be virtually traded during the trading session, each current price of an eligible asset being determined as a function of a current price quotation in effect during actual trading of the eligible asset on an exchange; (d) sending each determined current price for each eligible asset to both of the first and second participants during the trading session; (e) accepting buy and/or sell orders from the first and second participants for the virtual purchase and/or sale of respective quantities of eligible assets during the trading session, each order involving a respective quantity of a selected one of the eligible assets having a preset monetary value that is greater than the third monetary value by a leverage factor, wherein each order placed is filled at the asset price current at the time when the order is placed; (f) after each change in the price of any asset held by either of the first and second participants during the trading session, computing a difference between the sum of all gains and losses achieved by the first participant and the sum of all gains and losses achieved by the second participant; (g) stopping the trading session; and (h) adjusting the respective first and second trading accounts of the first and second participants as a function of the difference between the sum of all gains and losses achieved by the first participant and the sum of all gains and losses achieved by the second participant at the end of the trading session.

Another aspect of the invention is a method for facilitating competitive virtual trading of assets comprising the following steps: (a) establishing first and second accounts in a database for first and second participants respectively; (b) storing a first monetary value in the first account, the first monetary value representing an amount of money deposited by the first participant; (c) storing a second monetary value in the second account, the second monetary value representing an amount of money deposited by the second participant; (d) setting a risk parameter for a trading session, the risk parameter being a third monetary value representing a maximum amount of money that will be risked by each of the first and second participants during the trading session, the third monetary value being less than or equal to the first monetary value; (e)

determining a current price for each asset eligible to be virtually traded during the trading session, each current price of an eligible asset being determined as a function of a current price quotation in effect during actual trading of the eligible asset on an exchange; (f) sending each determined current price for each eligible asset to both of the first and second participants during the trading session; (g) accepting buy and/or sell orders from the first participant for the virtual purchase and/or sale of respective quantities of eligible assets during the trading session, each order involving a respective quantity of a selected one of the eligible assets having a preset monetary value that is greater than the third monetary value by a leverage factor, wherein each order placed by the first participant is filled at the asset price current at the time when the order is placed by the first participant; (h) accepting buy and/or sell orders from the second participant for the virtual purchase and/or sale of respective quantities of eligible assets during the trading session, each order involving a respective quantity of a selected one of the eligible assets having a preset monetary value that is greater than the third monetary value by a leverage factor, wherein each order placed by the second participant is filled at the asset price current at the time when the order is placed by the second participant; (i) after each change in the price of any asset held by either of the first and second participants during the trading session, computing a difference between the sum of all gains and losses achieved by the first participant and the sum of all gains and losses achieved by the second participant; (j) stopping the trading session; and (k) adjusting the respective first and second trading accounts of the first and second participants as a function of the difference between the sum of all gains and losses achieved by the first participant and the sum of all gains and losses achieved by the second participant at the end of the trading session.

A further aspect of the invention is a platform for facilitating competitive virtual trading of assets, comprising a computer having a network interface and a data storage memory, wherein the data storage memory stores first and second monetary values in respective first and second trading accounts of first and second participants, the first and second monetary values representing respective amounts of money deposited by the first and second participants, and the computer is programmed to perform the following steps: (a) setting a risk parameter for a trading session, the risk parameter being a third monetary value representing a maximum amount of money that will be risked by each of the first and second participants during the trading session, the third monetary value being less than or equal to each of the first and second monetary values; (b) determining a current price for each asset eligible to be virtually traded during the trading session, each current price of an eligible asset being determined as a function of a current price quotation in effect during actual trading of the eligible asset on an exchange; (c) sending each determined current price for each eligible asset to both of the first and second participants during the trading session; (d) accepting buy and/or sell orders from the first and second participants for the virtual purchase and/or sale of respective quantities of eligible assets during the trading session, each order involving a respective quantity of a selected one of the eligible assets having a preset monetary value that is greater than the third monetary value by a leverage factor, wherein each order placed is filled at the asset price current at the time when the order is placed; (e) after each change in the price of any asset held by either of the first and second participants during the trading session, computing a difference between the sum of all gains and losses achieved by the first participant and the sum of all gains and losses achieved by the second participant; (f) stopping the trading session; and (g) adjusting the respective first and second trading accounts of the first and second participants as a function of the difference between the sum of all gains and losses achieved by the first participant and the sum of all gains and losses achieved by the second participant at the end of the trading session.

Other aspects of the invention are disclosed and claimed below.

BRIEF DESCRIPTION OF THE DRAWINGS

FIGS. 4 and 5 are schematic screen shots showing two screens or windows viewed by a participant named ABC during registration in accordance with one embodiment of the invention.

FIGS. 6-10 are schematic screen shots showing various screens or windows viewed by participant ABC during creation of a standard trading session by ABC in accordance with one embodiment of the invention.

FIGS. 13-16 are schematic screen shots showing various screens or windows viewed by participant ABC during the management of the standard trading session created by ABC in accordance with one embodiment of the invention.

FIGS. 19-21 are schematic screen shots showing various screens or windows viewed by participant ABC during creation of an initiated trading session by ABC in accordance with one embodiment of the invention.

FIGS. 22 and 23 are schematic screen shots showing two screens or windows viewed by a participant named Shark who wishes to join the initiated trading session created by ABC in accordance with one embodiment of the invention.

FIGS. 24-27 are schematic screen shots showing various screens or windows viewed by participant ABC during the management of the initiated trading session created by ABC in accordance with one embodiment of the invention.

Reference will now be made to the drawings in which similar elements in different drawings bear the same reference numerals.

DETAILED DESCRIPTION OF THE INVENTION

Figure 1:
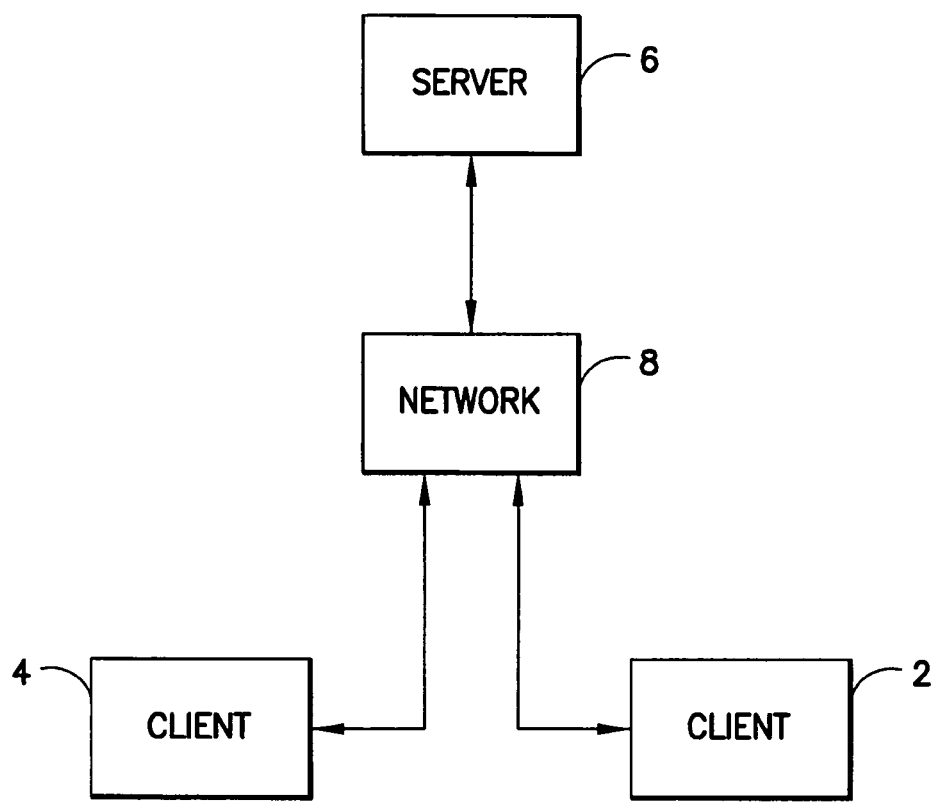
FIG. 1 is a block diagram showing the position of the trading platform disclosed herein relative to the respective positions of two platform users in accordance with various embodiments of the invention.

In accordance with various embodiments disclosed herein, a trading platform is provided for facilitating competitive virtual trading of securities and/or derivatives over the Internet or other network, wherein the monetary returns of the participants are based on their relative performances. Each participant may participate by using a client computer (e.g., blocks 2 and 4 in FIG. 1) located at a site remote from a server computer 6 that acts as the trading platform. The client computers 2 and 4 communicate with the trading platform 6 via a network 8. The network 8 may be a local area network or a wide area network, e.g., the Internet. In the latter case, each client computer has a web browser that interacts with the server computer 6.

The trading platform will enable (in any given time between Monday 0:00 GMT and Friday 24:00 GMT) two (or more) participants to participate in a new trading session. The platform will enable standard trading sessions or initiated trading sessions. Standard trading sessions are based on strict rules, whereas initiated trading sessions are based on customized (i.e., selected by the participant who created the trading session) rules.

During a session, the participants are each allowed to make a limited number of trades in various specific kinds of derivatives (for example, foreign currency, stocks, indices, commodities, etc.). At the start of trading for each session, the participants will have equal amounts of money that will serve as their respective session account balances. The number of transactions during each session will be limited in terms of time (the end of the day according GMT) or in terms of the maximum number of transactions allowed for any participant. [As used herein, the term "transaction" means either an opening buy order paired with a closing sell order or an opening sell order paired with a closing buy order. The term "transaction" as used herein does not mean a single buy or sell order.] Each position taken by a participant during virtual trading may be opened and closed by that participant placing a market order. Each participant will leverage his positions and his session account balance will be updated at the end of the trading session according his success or failure with each virtual transaction. During each trading session, each participant will receive updates concerning the difference between his session account balance and the session account balance of his rival. A participant will be automatically blocked from further trading if his session account balance reaches zero, or if the difference between his session account and his rival's session account reaches a maximum limit (the initial value of each session account balance, representing the maximum loss of each participant, will be used as the default maximum limit). Each participant can quit the session and will have his/her account balance adjusted at the end of the session in accordance with the difference between his absolute results (the summation of gains and losses from his/her virtual transactions) and the absolute results of his rival at the moment of exit. All virtual trades will be based on real market data (for example, real inter-bank bid/ask quotes for foreign currency) and each asset will be traded with 0 spread (e.g., the rate for transactions will be the middle value between bid/ask quotes). The platform provider will supply reliable real-time quotes and will serve as the other side for each virtual transaction. At the end of each session (e.g., because a time limit has been reached, a maximum number of allowable transactions by all participants has been reached, a participant has lost the maximum amount at risk, a participant's balance has reached zero, or a participant has quit), the participant with the lower session account balance will be charged according the difference between his session account balance and the session account balance of his rival. The platform provider will charge the winner with fixed percentage commission on his gains. Initiated trading sessions may have up to four participants, but in the event that one of the participants has lost the maximum amount at risk or has decided to quit or in the event that the session has ended because a time limit was reached or all participants have executed the maximum number of transactions allowed, the participants that did not achieve the highest monetary value in their session accounts will be charged according the difference between them and the participant with the highest session account balance.

From the aspects of utilization the new trading method will enable its participants to moderate their risks, to earn money even if all their transactions within a session lost virtual money, just because the rival lost more. Participants will compete against other participants and are able to avoid direct competition against professional banks and financial institutions as happens in the real trading world. The new method will enable trading platforms (especially from the realm of foreign currency where competition is very strong) to offer their clients an innovative service that combines competition and fun. The method disclosed herein will encourage the participants to execute more transactions with lower commissions. The new method can also be used for practicing and learning and will enable platforms to supply attractive demonstrations. It might also enable developers of automatic computing trading strategies to use their software against professional traders or against other automated software. The method will enable participants to build trading communities and also to identify other participants that can be allies for co-operation in the known trading exchanges.

The invention disclosed herein provides a trading platform that enables its participants to perform a number of transactions with known financial tools (like foreign currency spot prices and more) but instead of calculating the return of each participant according to the absolute gains or losses for all transactions that he/she executed within a limited period of time, the returns of a participant will be calculated according his relative results versus other participants (usually against one other participant, with the possibility to enlarge the competition to include up to four participants in each trading session). The trading platform will enable a participant to have gains even though the overall result of his/her transactions lost money. In contrast to current trading platforms that are based on absolute results of traders that execute real transactions against anonymous traders, in the trading platform disclosed herein each participant will execute virtual transactions (based on real quotes) versus the platform provider. The returns of each participant in the trading session will be determined according to his/her relative performance versus the performance of another identified participant. A participant can have gains because he achieved superior results versus another participant and it does not matter if he lost virtual money as a result of all of his virtual transactions provided that his rival lost more.

For example, assume two participants who were each willing to risk up to $1,000 within a trading session. Each of them executed five virtual transactions involving foreign currency spot prices. Both started with $1,000. If one of them ended the session with $500 (an absolute loss of $500) and the second ended the session with $300 (an absolute loss of $700), then the winner will get $200 from the loser and from this amount the platform provider will deduct a fixed percentage (e.g., 10%) commission. Instead of losing money in platforms that base their returns on absolute results, one of the participants will have a gain and the other will lose less.

In contrast to current trading platforms, the participants will not pay commissions or any spreads (the difference between bid and ask prices) for each single trade that they execute. However, at the end of a session, the winner will pay the platform provider a fixed percentage of his gains.

The trading platform disclosed herein should enable its participants to execute private trading in a closed environment. All the participants in a trading session will be identified and the platform provider will account for each participants gains and losses in accounts funded by the participants.

In the case of one-on-one sessions, the trading platform will enable a participant to open a trading session at any given time from Monday through Friday. The second participant must then join the session created by the first participant. The participants should each execute within a trading session a limited number of transactions. Each trading session will end automatically at a pre-designated time, e.g., the end of the day (at 24:00 GMT). Each transaction will involve the purchase and sale of derivatives on assets such as foreign currency, commodities, stocks, indices and ETFs.

Each participant must deposit money with the trading platform before the session is started. The amount of money deposited (e.g., by credit card) must be greater than or equal to the amount of money that will be at risk during the trading session. Each participant will start the trading session with the same agreed amount of money (i.e., the money at risk) in his/her session account in order to handle his/her transactions during the session.

In one example, the minimum amount of money that can be risked in a trading session will be $1000 and each participant can trade assets using leverage (in a standard trading session, the leverage factor might, e.g., be 10).

Each participant may make up to 10 transactions during a standard trading session. If all participants have closed their maximum number of allowed transactions, the session will end automatically and the participant who has the higher session account balance will get from the loser the difference between their session account balances (less the commission to the trading platform).

In some cases, the trading session is ended because of a time limit has expired. For example, assume that two participants have each moved $1,000 from their respective accounts with the platform (i.e., their exchange accounts) to respective special session accounts that will be opened when a trading session starts and will be closed at the end of the session. Assume that both participants may execute up to 10 transactions involving foreign currency until 24 GMT of the day. Each buy or sell order of a transaction is executed based on real-time price quotes without any spread between the real-time bid and ask quotes. Each asset traded is a virtual derivative and the party on the other side of the transaction is the platform provider, who is responsible for supplying reliable real-time quotes, but in contrast to regular exchanges the platform provider is not exposed to real losses or gains on the transactions executed by the participants in the trading session. For example, assume that two participants each choose to execute just one transaction until the end of day. Participant 1 bought $10,000 USD versus CHF and gained virtually $200 from the transaction at the end of the day. Therefore, his/her session account will be $1,200 at the end of the day. Participant 2 bought $10,000 USD versus JPY and lost virtually $100 from the transaction at the end of the day. Therefore, his/her session account will be $900 at the end of the day. The platform provider will close the virtual transactions (without any real gain or real loss to the platform provider). As a result of this trading session, participant 1 will receive $300 from participant 2 less a fixed-percentage commission (e.g., 10%) paid to the trading platform. At the end of the day the account of participant 1 will be credited with the 1000 that he was willing to risk and were moved to the session account until it ended plus the $300 gain less $30 commission, giving a new balance in his/her exchange account of $1,270. Participant 2 will be credited with the $1,000 that he put at risk minus the $300 that he lost to participant 1, giving a new balance in his/her exchange account of $700.

The trading platform will end a session automatically if the session time limit has been reached, if the maximum number of closed transactions have been executed by both participants, if one of the participants made bad transactions that resulted in his session account balance reaching zero, or because the difference between the respective session account balances of the two participants has reached its limit.

The following example shows how the session account balance of a participant may reach zero. Assume that two participants each made losing transactions and one of them lost all the money in his session account. Participant 1 started with $1,000 and after five virtual transactions lost all of the $1,000 in the session account, while participant 2 also started with $1,000 and lost on his virtual transactions and decreased his session account balance to $500. In such a case the session will be stopped and participant 1 will pay participant 2 the difference between his session account balance and that of his rival, i.e., $500 in this case. At the end of the session, participant 1 will get back $500 from his/her session account to his/her exchange account and participant 2 will get back to his exchange account $1,000 plus a $500 gain from participant 1 minus a commission of $50 paid to the platform provider, leaving a new balance of $1,450 in his/her exchange account.

Alternatively, the session will be stopped when the difference between the respective account balances of the participants reaches a maximum limit. For example, if they each started with $1,000 at risk, that amount will be the maximum, which when reached, would cause the platform to end the trading session. In such a case the session will be stopped and the participant that lost will pay the winner all the money at risk. For example, if both participants started with $1,000 in each session account and one of them got to $1,600 while the other participant got to $600, then at that moment the session will be stopped, the winner will get to his exchange account the $1,000 that he was willing to risk plus $1,000 that he gained from his rival minus a commission of 100 (10% from his gain), and the loser that was willing to risk $1,000 will get no monies deposited to his exchange account.

In accordance with one embodiment of the invention, continuously during the session, each participant can see the difference between his own and his rival's session account balances and what transactions his rival has made. A participant can decide to quit the session and his returns (or costs) will be based on the difference between his own and his rival's session account balances at that time. For example, if a participant that started with $1,000 sees that his session account balance is currently at $1,100 while his rival's balance is at $800, he can opt to quit and thus win $300 before commission.

As will be explained in more detail later with reference to drawings, the trading platform computer is programmed to provide either standard trading sessions or initiated trading sessions. At any given time between Monday (0:00 GMT) and Friday (24:00 GMT), the trading platform will allow trading sessions to be set up by participants.

Figure 2:
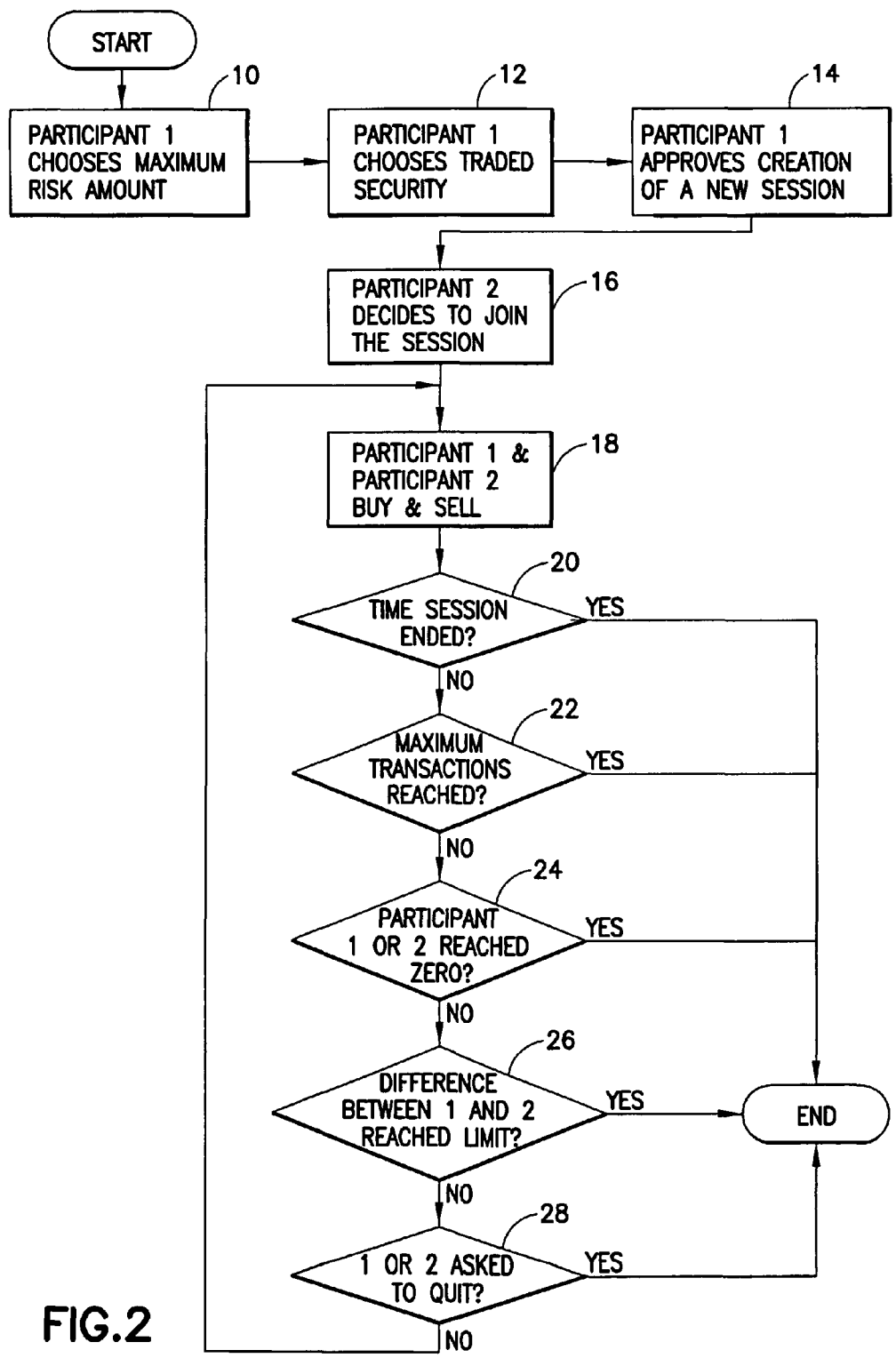
FIG. 2 is a flowchart showing various steps of a procedure enabling two participants to trade during a trading session in accordance with one embodiment of the invention.

FIG. 2 is a flowchart showing steps in a method for trading in a standard trading session. A standard trading session is limited to two participants. In order to create a standard trading session, Participant 1 first chooses the maximum amount of money he/she wishes to risk in the session (box 10 in FIG. 2). In a standard session, the amounts that can be risked are preset at the following selectable values: $1,000, $2,000, $5,000 and $10,000. Then Participant 1 chooses the asset or assets to be eligible for trading during the session (box 12). The selection can be made from any one of a plurality of categories of trading assets (e.g., foreign currency, commodities, stocks indices, ETFs), including: (1) trading one asset from one trading category; (2) trading all assets in one category; or (3) trading all assets in all categories. After Participant 1 has selected the maximum amount of risk and the traded security, he/she approves the creation of a new standard session, which approval includes acceptance of all terms of an agreement governing the session (box 14 in FIG. 2). Thereafter, Participant 2 may join the session by also accepting all terms of the agreement governing the session (box 16 in FIG. 2). The session will be closed for other participants. The trading platform will then move the amount of money at risk from each participant's exchange account into their respective session accounts for use during the trading session. This money will be the maximum that either participant might lose as a result of the session.

Once the session has started, both participants are now free to buy and sell any asset that is eligible for trading (box 18 in FIG. 2). Within each session they will be allowed to a maximum of 10 transactions, each transaction consisting of an opening trade and a closing trade. The value of each trade (in terms of virtual money) will be equal to the maximum amount at risk (with is real money) times a leverage factor of 10.

FIG. 2 shows five events which will trigger termination of the trading session. The trading platform will end the session when any of the following events occurs: a preset time limit is reached (decision block 20); the maximum number of closed transactions has been made by both participants (decision block 22); the session account balance of either participant has reached zero (decision block 24); the difference between the session account balances of the two participants has reached the maximum amount at risk (decision block 26); or either participant has decided to quit the session before the preset time limit has been reached (decision block 28).

Each transaction during a trading session will be based on fixed virtual monetary value of the asset traded. The size of each leveraged transaction will be adapted according to the money deposited in the session account. For a session in which the maximum amount of real money at risk is $1,000, each trade during the session will have a value in virtual money of $10,000; for a session in which the maximum amount of real money at risk is $10,000, each trade during the session will have a value in virtual money of $100,000. The participants can trade virtual derivatives on a variety of base assets that are traded on exchanges such as Nasdaq, CME, NYSE, Forex, etc.). The price quotes (bid and ask) used by the trading platform disclosed herein will be synchronized with the streaming quote data obtainable from known exchanges and can also arrive from information agencies like Reuters and Bloomberg.

When a participant trades foreign currency, each transaction will be a fixed size and every pip will cause the session account balance of that participant to increase or decrease. [In forex trading, a "pip" is the smallest unit by which a currency may change value.] For example, a participant that started with $1,000 and then opened a long transaction of $10,000 on the Euro/USD currencies at 1.3000 will increase his session account balance by $100 (1% of $10,000) if the rate rose by 1% to 1.313 (an increase of 130 pips). A participant that opened a transaction on Euro/JPY will increase or decrease his session account balance according to the changing exchange rate of the Euro/JPY currency pair with translation to US dollars. This principle may be applied in general to all trading assets. If the participant went long on Euro/JPY ($100,000 size) and the Euro rose against the JPY 2%, after closing the transaction, he would get 2% of the $100,000, i.e., a gain of $2,000 for the transaction. Just by that way there is translation to dollars (what is important is the change in percentages)

When the participants wish to also trade a single stock (for example, a stock that is a component of the Nasdaq 100), they will buy or sell derivatives on the single stock according to the fixed size of the session. For example, a participant that started with $1,000 can short Intel stock (symbol INTC) in the amount of $10,000 at a selling price of $21 per share. If the INTC stock were to rise to $22 per share, then the participant's session account will be increased by $476 (i.e., 1/21× $10,000).

At any time during the session a participant can open or close a transaction at a rate that reflects the fair value of the asset. In accordance with one embodiment of the program run by the trading platform, the value will be the midpoint between the real bid and ask quotes streaming into the platform from other exchanges). The opening and closing of transactions will be executed with market orders. The platform will use zero spread and will not take commission for each trade or each transaction (opening and closing trades). The winner of each session will pay X % (e.g., X=10) of his gain to the platform provider. The loser will not pay any commission.

Figure 3:
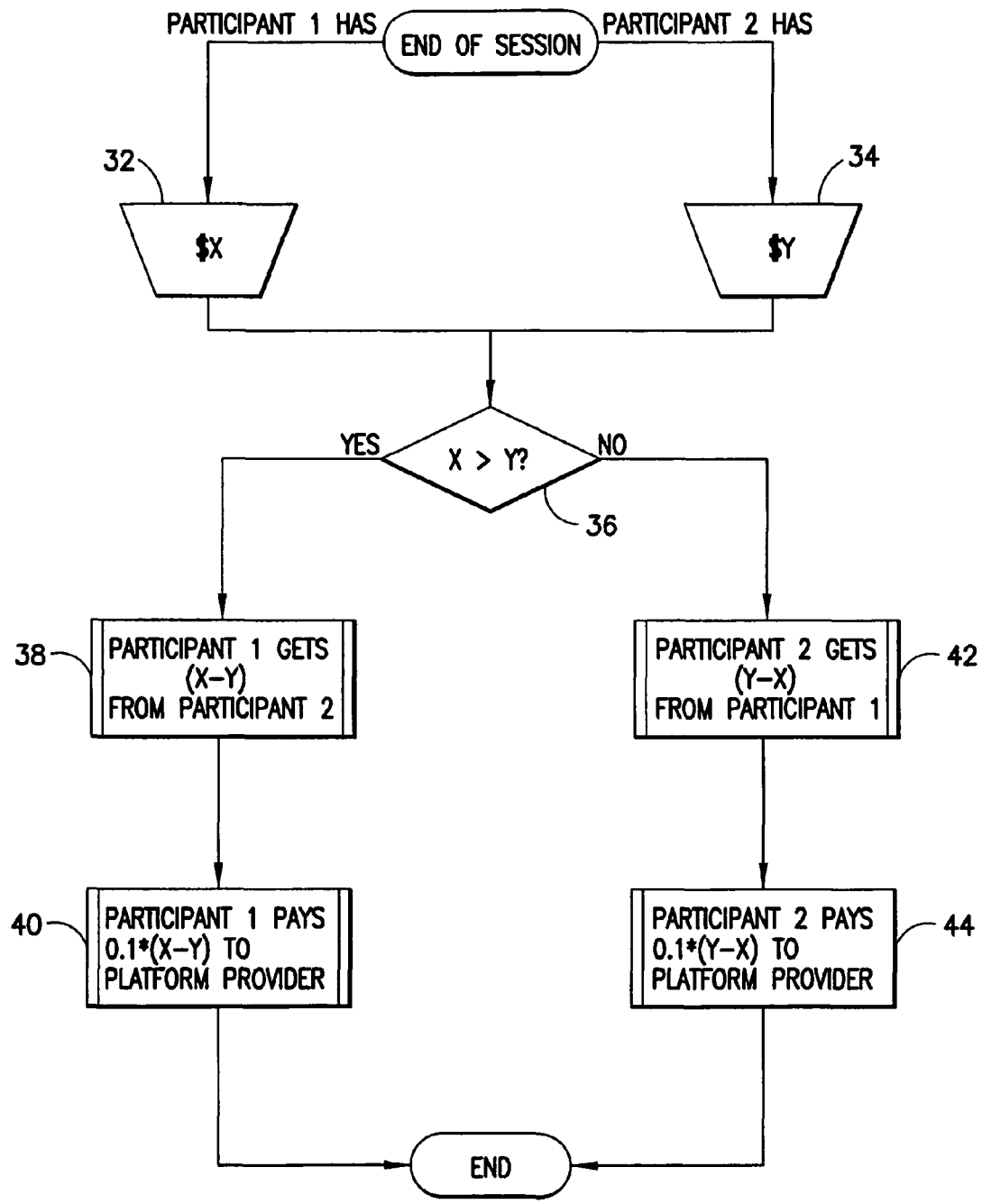
FIG. 3 is a flowchart showing various steps of an accounting procedure invoked at the end of a trading session in accordance with one embodiment of the invention.
Figure 11:
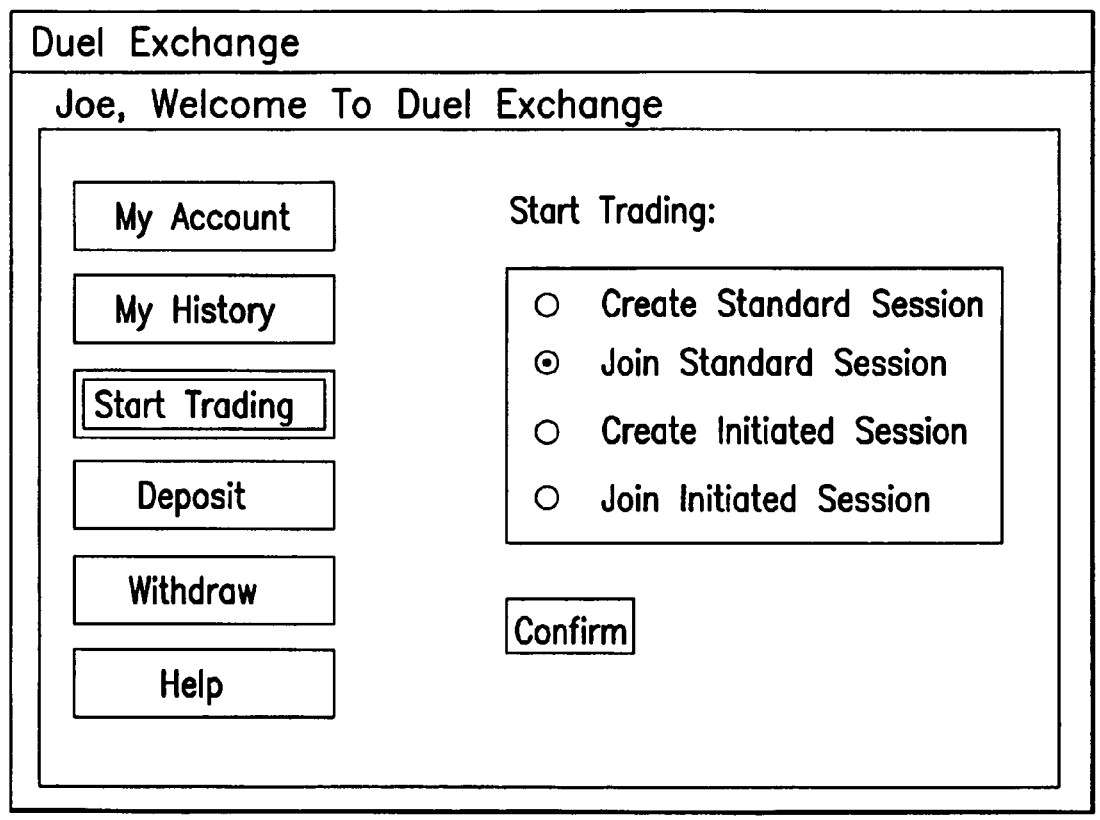
FIGS. 11 and 12 are schematic screen shots showing two screens or windows viewed by a participant named Joe who wishes to join the standard trading session created by ABC in accordance with one embodiment of the invention.

At the end of each session, the trading platform performs an accounting algorithm (depicted in FIG. 3) to determine the gain, loss and commission resulting from the trading session. First, at the end of the session the trading platform checks the session account balances of the two participants. The balance in Participant 1's session account is $X (see block 32 in FIG. 3); the balance in Participant 2's session account is $Y (see block 34). The computer at the trading platform then determines whether X is greater than Y (decision block 36). If X>Y, then Participant 1 gets $(X−Y) from Participant 2 (block 38) and Participant 1 pays a commission to the platform provider equal to $0.1 (X−Y) (block 40 in FIG. 3). Conversely, if Y>X, then Participant 2 gets $(Y−X) from Participant 1 (block 42) and Participant 2 pays a commission to the platform provider equal to $0.1 (Y−X). Obviously, if at the end of the session the unlikely event occurs that X=Y, then neither participant pays the other and the trading platform receives no commission. Of course, in the latter situation, the trading platform may include a provision in its agreements with participants that each participant will pay a flat fee to the trading platform in the event of a draw to avoid a situation whereby participants use the platform and pay nothing to the platform provider.

The same assets are eligible for trading in the standard session or the initiated session. The only difference is in the composition of the selected assets (for example, in the standard session just one category or all can be selected whereas in the initiated session one could select more than one category and within each category more than one asset. The trading platform provider can enlarge the list of assets also to include assets such as derivatives on bonds and mutual funds.

In initiated trading sessions the transactions are based on additional parameters selected by the participant who creates the session. In other words, the participant is better able to customize the trading rules governing the session to suit his particular preferences. For example, when creating an initiated session, the creating participant can enter a maximum amount of risk other than the four options available for the standard trading session. Also, an initiated trading session can be set up to have 2, 3 or four participants, whereas the standard sessions are limited to two participants. Other options available to a participant creating an initiated session (and not available to a participant creating a standard session) include the ability to enter a leverage factor different than 10, the ability to set a time limit when the session will end, and the ability to select a maximum number of transactions different than 10. Also a participant creating an initiated trading session may opt to invoke a monetary penalty in the event that a participant quits the session before the session time limit expires, the amount of the monetary penalty being set by the participant.

The process of the initiated session will be similar to the standard session with adaptation according to the customized characteristics selected by the participant who created the initiated session.

For example, a participant can offer on Monday to open a session for two participants, wherein each participant has $1,000 in his/her session account, each participant can make only three transactions only on USD/JPY, the session will end automatically at the end of the following Friday, and each transaction can be leveraged by a factor of up to 50. The session will be stopped automatically when the difference between the respective session account balances of the participants becomes $500. If one of the participants decides to quit before the session ends automatically, the quitting participant will pay the other participant a penalty of $100 (that will be added to the debit of the quitting participant if he is the loser or will be deducted from the credit of the quitting participant if he is the winner.

During this exemplary initiated session, the participants can open and close long/short transactions on USD/JPY. At any given time each participant can see the session account balances of both participants, how many more transactions each participant can execute, and the difference between the respective session account balances of the participants. The session will be ended under similar circumstances previously discussed in the context of the standard session. After the session has ended, the account of the winner will be credited with his gains less commission and the account of the loser will be debited with his losses. If one of the participants decided to quit before the session ended automatically, he will pay the other side the agreed quit penalty. For example, if both participants started with $1,000 and then one participant quit when he had $1,300 and his rival had $800, then the winning, but quitting participant will get from the loser before commissions just $400, not $500.

In a standard trading session, the transaction size for each virtual transaction is always 10 times the maximum amount of risk selected by the participant who created the standard session. Since only four options are provided for the maximum amount of risk, there will be only four possible transaction sizes. In contrast, the participant who creates an initiated trading session has much greater leeway in customizing the transaction size because that participant is given the options of setting both the maximum amount of risk and the leverage factor, the product of which will be the transaction size.

The rules of an initiated trading session having three or four participants will be similar for those for two participants with some adaptations. When the initiated session is ended for any reason, the participants who did not achieve the highest value in their respective session accounts will be charged according to the difference between them and the participant with the highest session account balance. For example, assume that three participants start trading during an initiated session with $1,000 each; the session ends at the end of day; the participants can trade foreign currency; the number of possible transactions for each participant is 5; and the maximum difference allowed in their respective session account balances is $1,000 with leverage up to 10. In case that Participant 1 executed positive transactions that produced a session account balance of $1,500, while Participant 2 had a balance of $1,200 and Participant 3 executed bad virtual transactions that produced a session account balance of $500 at a particular time. At that moment the session ends automatically. Participant 3 will pay Participant 1 $1,000 whereas Participant 2 will pay Participant 1 $300. Also Participant 1, who gained $1,300 from the session, will pay the platform provider the fixed percentage commission (for example 10%). At the end of the session, Participant 1, who risked $1,000, will get back to his exchange account his original $1,000 plus $1,000 less a $100 commission from Participant 3 plus $300 less a $30 commission from Participant 2. Participant 3, who lost $1,000 to Participant 1, will get 0 to his exchange account and Participant 2 will get back $1,000 less $300, i.e., a total of $700 to his exchange account.

The screen shots shown in FIGS. 4-30 depict what the computer user sees on the display screen of the computer or other device during use of the trading platform in accordance with one embodiment of the invention. The trading platform might be implemented as an Internet application. It might be supplied as a web-based application and/or an Internet client application.

The first step of the user (i.e., participant) for using the application will be to login. As seen in FIG. 4, the user must enter his user name and his password in respective fields displayed in the Login window. The user then submits the inputted information by clicking on the "Confirm" virtual button (hereinafter "button"). A new participant that does not have an account should open a new account by clicking on the "New Account" button and then registering.

FIG. 5 shows the window that appears in response to the user clicking on the "New Account" button. The new participant will choose a unique identifier in the system and will fill in all the other required Information as shown. All the fields in the screen might be mandatory and can also include the age and experience of the participant in trading. For the purpose of illustration, it will be assumed that the identifier of the new participant that joins the trading platform is ABC.

After registration, ABC can start to participate in competitive trading. FIG. 6 shows the same window previously shown in FIG. 4, but now ABC has filled out the "Participant" and "Password" field. To gain access to the trading platform, ABC must thereafter click on the "Confirm" button.

In response to that confirmation from the user, the window shown in FIG. 7 appears on the user's display screen. The user can click on any one of six buttons arranged in a column on the far left-hand side of the window seen in FIG. 7. The "My Account" button has been depicted in a manner intended to distinguish it from the other five buttons, the distinction being that the user ABC has already clicked on the "My Account" button and in response to that interaction, a column of three fields has been displayed in the center of the window, the fields being respectively named "Your Account Balance", "Last Deposit", and "Last Withdrawal". In this particular example, the second and third fields are blank while the first field has been filled with characters indicating that the user's current balance in his/her account is zero.

Because the balance in ABC's account is zero, ABC needs to deposit money in order to participate in trading sessions. To initiate the process of making a deposit, ABC must click on the "Deposit" button seen in FIG. 7. In response to ABC electing to make a deposit, the window shown in FIG. 8 appears on the user's display screen. In the example depicted in FIG. 8, ABC has elected to deposit $50,000 by entering that amount in a field using a keyboard, keypad or other input device. In order to deposit the indicated amount of funds using a credit card, ABC would then need to enter information in the various fields indicated in FIG. 8. As an alternative, ABC could ask his/her bank to transfer money from his/her bank account to his/her account with the trading platform.

After the deposit has been made, ABC is ready to participate in a trading session. To initiate a trading session, ABC must click on the "Start Trading" button. In response to ABC electing to start trading, the window shown in FIG. 9 appears on the user's display screen. This window again includes the same column of virtual buttons on the far left-hand side of the window as previously seen in FIGS. 7 and 8. In the center of the window, a stack of selectable buttons indicates the type of trading session which the user may select. More specifically, the user may make any one of the following selections: (1) create a standard session; (2) join a standard session; (c) create an initiated session: or (4) join an initiated session. In the example depicted in FIG. 9, ABC has decided to create a standard session. (ABC might learn about the standard sessions by clicking on the "Help" button or from knowing the system in another way.) A standard session is designed to enable the participants to trade derivatives with leverage of 10, meaning that the amount of real money risked by a user will be converted into 10 times that amount in trading (i.e., play) money for use during the standard trading session. Standard sessions are limited to two participants, one who creates the session and the other who later joins the session.

In response to ABC clicking on the "Confirm" button seen in FIG. 9, the window shown in FIG. 10 appears on the user's display screen. To create a standard session, ABC must perform four steps. First, ABC must select one of four numbers representing different standard maximum amounts of risk to be taken on at the outset of the trading session. In the example depicted in FIG. 10, the user has clicked on the button associated with $10,000 to indicate the maximum amount of money ABC is willing to risk in the trading session. Second, ABC must select one of five standard trading categories, each category including assets of a respective type. In the example depicted in FIG. 10, the user has clicked on the button associated with foreign currency (FOREX) to indicate the user's desire to trade in currencies during the session. Third, ABC must select which trading asset in the selected trading category the user wishes to trade during the session by clicking on one of a multiplicity of foreign currency pairs appearing in a "Select Trading Asset" drop-down list. In the example depicted in FIG. 10, the user has elected to trade US dollar/Japanese yen. Lastly, ABC is presented with terms of the agreement governing the trading session in response to clicking on the "Continue" button. ABC can accept the terms of the agreement by clicking on "I Agree".

The terms of the specific agreement governing the session created by ABC include confirmation of the ABC's selections and indications that the maximum number of transactions allowed during the created session will be 10, that the session will end at a preset time, and that the size of each transaction will be $100,000 in play (i.e., not real) money (i.e., 10 times the maximum amount of real money at risk). The agreement also states under what circumstances the trading session will be terminated: (1) if the user who created the session or the other participant decides to quit; (2) if either participant's balance (play money) reaches zero during the session; (3) if the difference between the respective balances of the two participants reaches the maximum amount of risk (which in this example is $10,000) during the session; or (4) if both participants have closed 10 transactions. As further stated on the screen shown in FIG. 10, in order to open the session, the participant who created the session must wait until another participant joins the session. The session will expire if no one joins the session within an hour. The trading platform will send an e-mail to ABC informing him/her that the session he/she created has expired. The session will end at 00:00 GMT because ABC chose to trade foreign currency. (If he/she chose to trade, for example, a single stock such as Teva, the session would end at 21 GMT when exchanges in the U.S.A. are closed.)

After the standard session has been created by ABC, another person having the identifier "Joe" may choose to participate in a standard session using a computer located at a site remote from ABC's location. To join a standard trading session, Joe must first login and then click on the "Start Trading" button displayed on the screen of his computer. In response to Joe electing to start trading, the window shown in FIG. 11 appears on Joe's display screen. This window again includes the same column of virtual buttons on the far left-hand side of the window as previously seen in FIGS. 7-9. In the example depicted in FIG. 11, Joe has decided to join a standard session by clicking on the button designated "Join Standard Session". In response to Joe also clicking on the "Confirm" button, the screen shown in FIG. 12 will appear on Joe's display screen.

Figure 12:

As seen in FIG. 12, Joe is presented with a list of standard sessions that have been created and are not yet expired. The list includes various columns displaying the following information for each session listed: (1) the maximum amount of risk; (2) the identifier of the person who created the session; (3) the trading category; (4) the assets to be traded; and (5) the time remaining before the session will expire. In the example depicted in FIG. 12, Joe has chosen to join the standard session created by ABC. Because there were 20 minutes remaining before expiration of the session, this means that ABC had been waiting 40 minutes since creating the session. In response to clicking on the session created by ABC and then clicking on the "Continue" button, all of the terms of the standard session created by ABC are displayed and Joe is asked to agree to those terms. After Joe has clicked on the "I Agree" box, the display screen will indicate that the session will begin in 30 seconds. The trading platform also sends an e-mail to ABC with a breaking news announcement that the session is going to start.

FIG. 13 is a screen shot showing how the session is managed from the viewpoint of ABC. ABC is updated how much time is left until the end of the session, what his/her balance in the session is, what Joe's balance is and what the difference in their respective balances is. The screen shot also displays all of the respective positions for both participants. In the example depicted in FIG. 13, there has only been one transaction since the start of the session, namely, at time 21:25:30 Joe bought $100,000 of USD/JPY at a rate 100.00. Accordingly, the screen indicates that Joe has an open long position.

In the example depicted in FIG. 13, the current rate for the USD/JPY trading asset is 99.80, resulting in a potential loss of −$200.00 for Joe. The current rate of the trading asset is received as streaming data from an information source such as a known exchange or Bloomberg. There is no spread in the trading platform. The rate is the average between the best Bid price and the best Ask price. As a result of Joe's potential loss, the difference in the respective balances of the participants is +$200.00 in ABC's favor. As indicated at the bottom of the screen shown in FIG. 13, ABC can quit the session (by clicking on the "Quit Session" button) because ABC does not have an open transaction. Closing all open transactions might be a signal for the rival that the participant might quit the session before other stopping events happen.

ABC has the option of either buying or selling the USD/JPY asset. ABC can see that Joe went long on USD/JPY some minutes ago and decides to sell the pair at 99.80 (short). In response to ABC clicking on the "Sell" button, a Sell (Short) window pops up on the display screen. ABC can confirm the transaction by clicking on the "Yes" button in the Sell (Short) window.

FIG. 14 shows the same Managing Session screen as seen by ABC but at a later time, i.e., after ABC sold the USD/JPY asset as seen in FIG. 13. The Managing Session screen at all times gives the current rate for the asset being traded (i.e., 99.00). The respective current positions of the participants in this session are also listed. Because ABC now has an open position, the display screen now includes a "Close" button which ABC can click on in order to close his/her open position. The time of each transaction is indicated along with other details of the respective transactions, including the open price or rate for each transaction. In the example depicted in FIG. 14, the USD fell against the JPY after ABC went short at Time 21:29:37, from 99.80 to 99.00. As a result ABC has a current gain of $801.60 for that transaction (80/99.80×$100,000=0.8016%). Conversely, Joe's potential loss has increased from −$200.00 to −$1,000.00. As a result, the current difference in the respective balances of the participants is +$1,801.60 in ABC's favor. In the example depicted in FIG. 14, ABC has decided to close his/her open position by clicking on the "Close" button. In response to ABC clicking on the "Close" button, a Close Short window pops up on the display screen. ABC can confirm the transaction by clicking on the "Yes" button in the Close Short window. Thus ABC had a gain of +$801.60 for his/her first position.

FIG. 15 shows the same Managing Session screen as seen by ABC at a yet later time, i.e., after ABC closed his/her first position. The Managing Session screen now indicates that the current rate for the asset being traded is 98.50. The respective current positions of the participants in this session are still listed. The current status of the positions of the respective participants is that ABC has no open positions while Joe still has an open position. In the example depicted in FIG. 15, the USD fell further against the JPY after ABC closed his/her position, from 99.00 to 98.50. As a result, Joe's loss has increased further from −$1,000.00 to −$1,500.00. As a result, the current difference in the respective balances of the participants is +$2,301.60 in ABC's favor.

Because ABC has no open positions, the "Quit Session" button has been restored on the display screen seen by ABC. In the example depicted in FIG. 15, ABC has now decided to quit the session with a potential gain before commission of $2,301.60. ABC gained $801.60 for his/her transactions and Joe lost $1,500.00 for his transaction. (Joe lost 1.5% for his transaction of 100,000, which is 15% of his amount at risk in the session, which was $10,000.)

Figure 16:
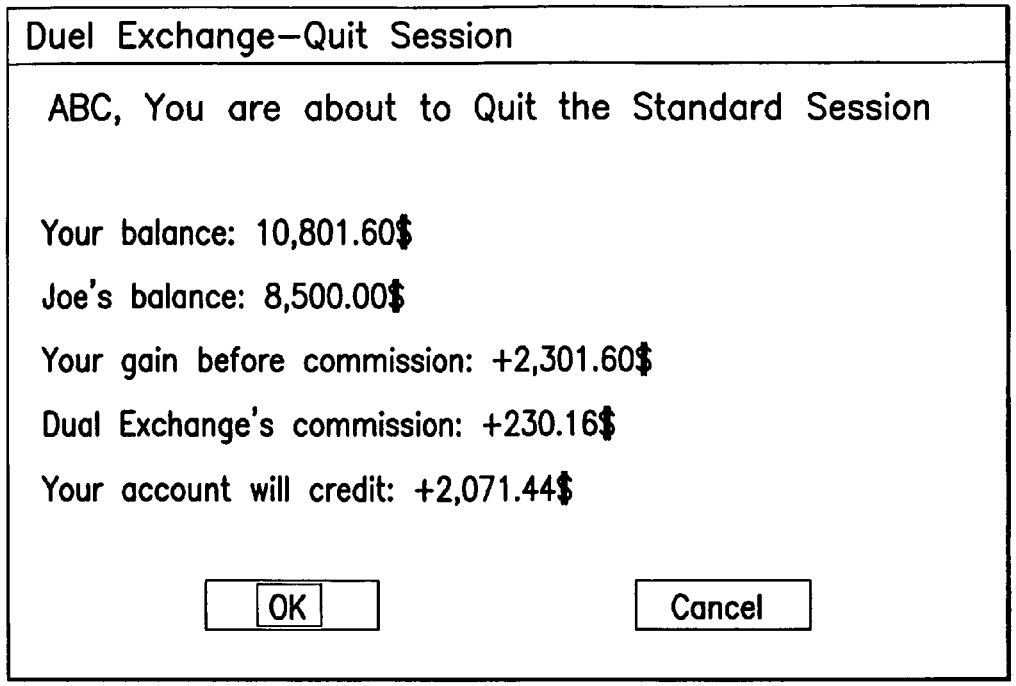
Figure 17:
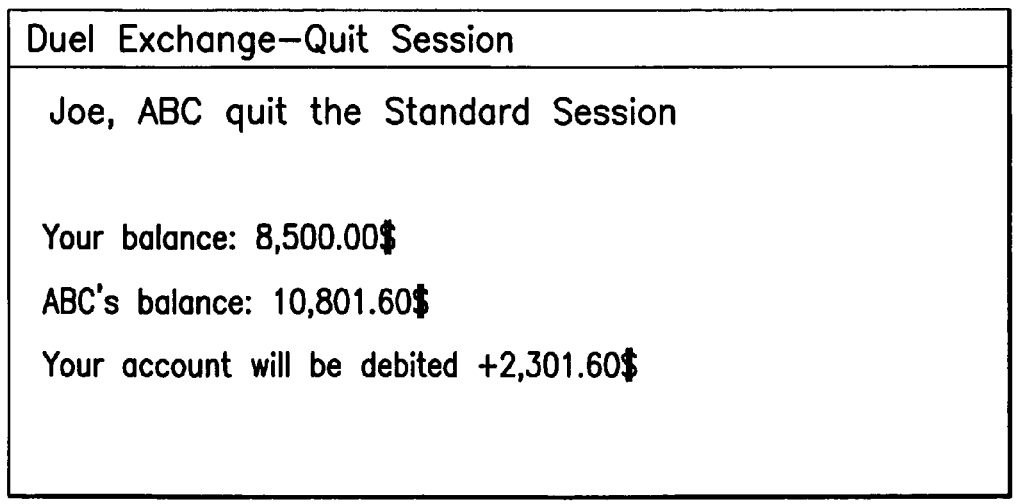
FIG. 17 is a schematic screen shot showing a screen or window viewed by participant Joe after ABC has quit the standard trading session created by ABC in accordance with one embodiment of the invention.

In response to clicking on the "Quit Session" button seen in FIG. 14, the window depicted in FIG. 16 appears on the display screen being viewed by ABC. ABC is asked to confirm that he/she wishes to quit the session by clicking on the "OK" button. The Quit Session window displays the respective balances of the participants, ABC's potential gain before commission, the amount of commission to be transferred from ABC to the trading platform (in this example, 10% of ABC's gain), and the gain less commission to be credited to ABC's account. If ABC delays the confirmation, Joe's balance of Joe should be updated according the status of his open position. If ABC delays more than 10 seconds or clicks on the "Cancel" button, ABC's request to quit the session will be canceled. In the example depicted in FIG. 16, ABC has confirmed that he/she wishes to quit the session.

In response to confirmation from ABC that he/she has quit the session, the trading platform sends a breaking news announcement (see in FIG. 17) that pops up on the Managing Session screen on Joe's computer (if he is there on-line). The announcement notifies Joe that ABC has quit the session and also indicates the respective balances of the participants and the amount to be debited to Joe's account. Also the trading platform sends an e-mail with identical content to Joe.

Figure 18:
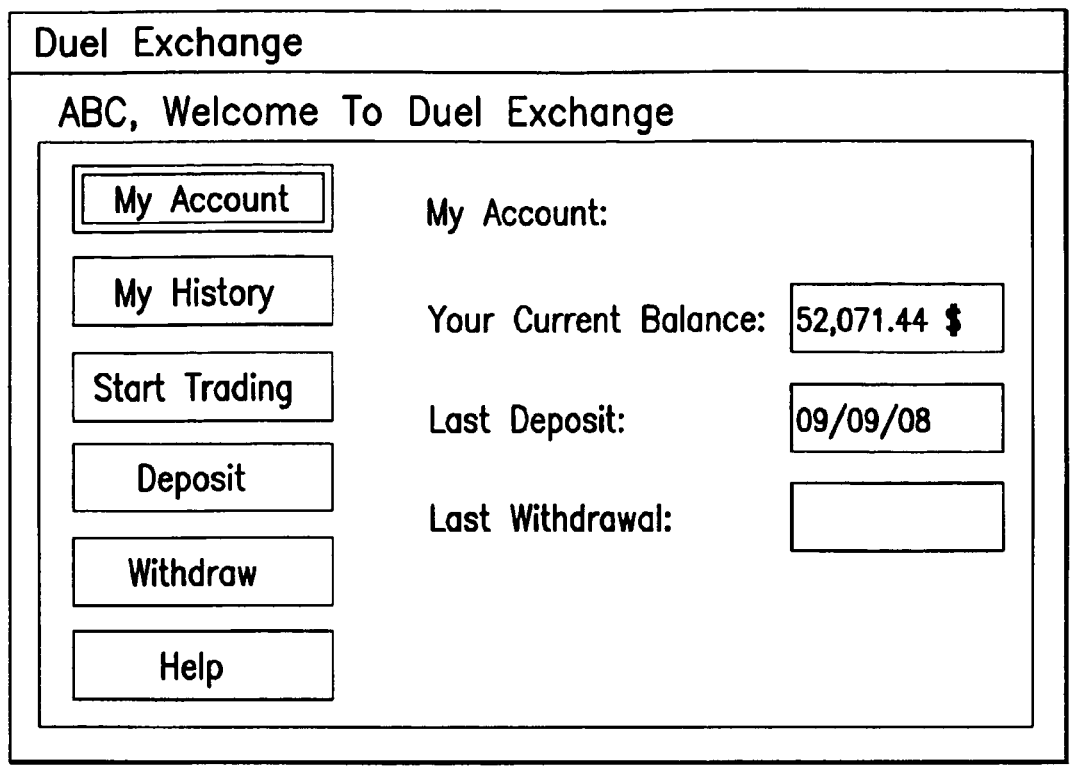
FIG. 18 is a schematic screen shot showing a screen or window viewed by participant ABC after the standard trading session created by ABC has been stopped in accordance with one embodiment of the invention. The screen or window shows the current balance in ABC's account.

After winning in his/her trading competition with Joe, ABC can check his/her account balance in the trading platform by returning to the window previously shown in FIG. 7. As seen in FIG. 18, ABC's current balance is now $52,071.44, which includes the $50,000.00 deposited on Sep. 9, 2008 and $2,071.44 won from Joe.

For the sake of further illustration, it will now be assumed that ABC decides to create an initiated trading session. As previously described, to initiate a trading session, ABC must click on the "Start Trading" button. In response to ABC electing to start trading, the window shown in FIG. 19 appears on ABC's display screen. This window again includes the same column of virtual buttons on the far left-hand side of the window as previously seen in FIG. 9. In the center of the window, the same stack of selectable buttons appears as previously described. In the example depicted in FIG. 19, ABC has decided to create an initiated session. An initiated session differs from the standard session in that the initiator has more choices with respect to the amount of leverage, the maximum number of transactions and the types of assets that can be traded. Also the maximum number of participants is selectable, i.e., two, three or four.

Figure 19:
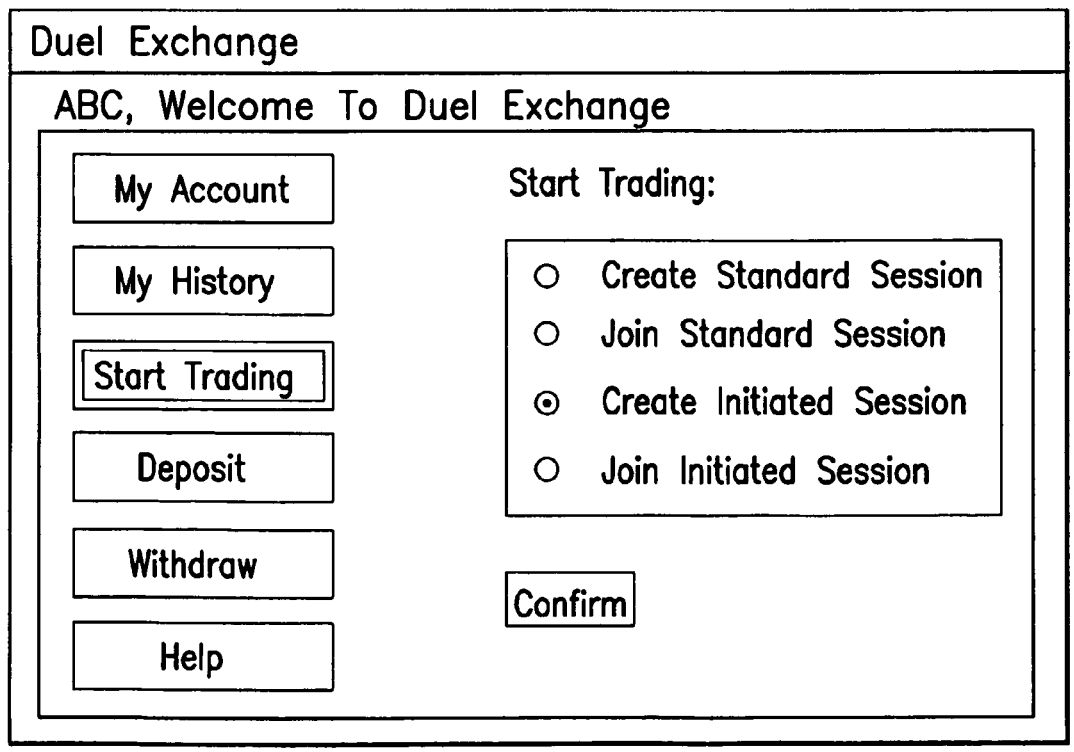
Figure 20:
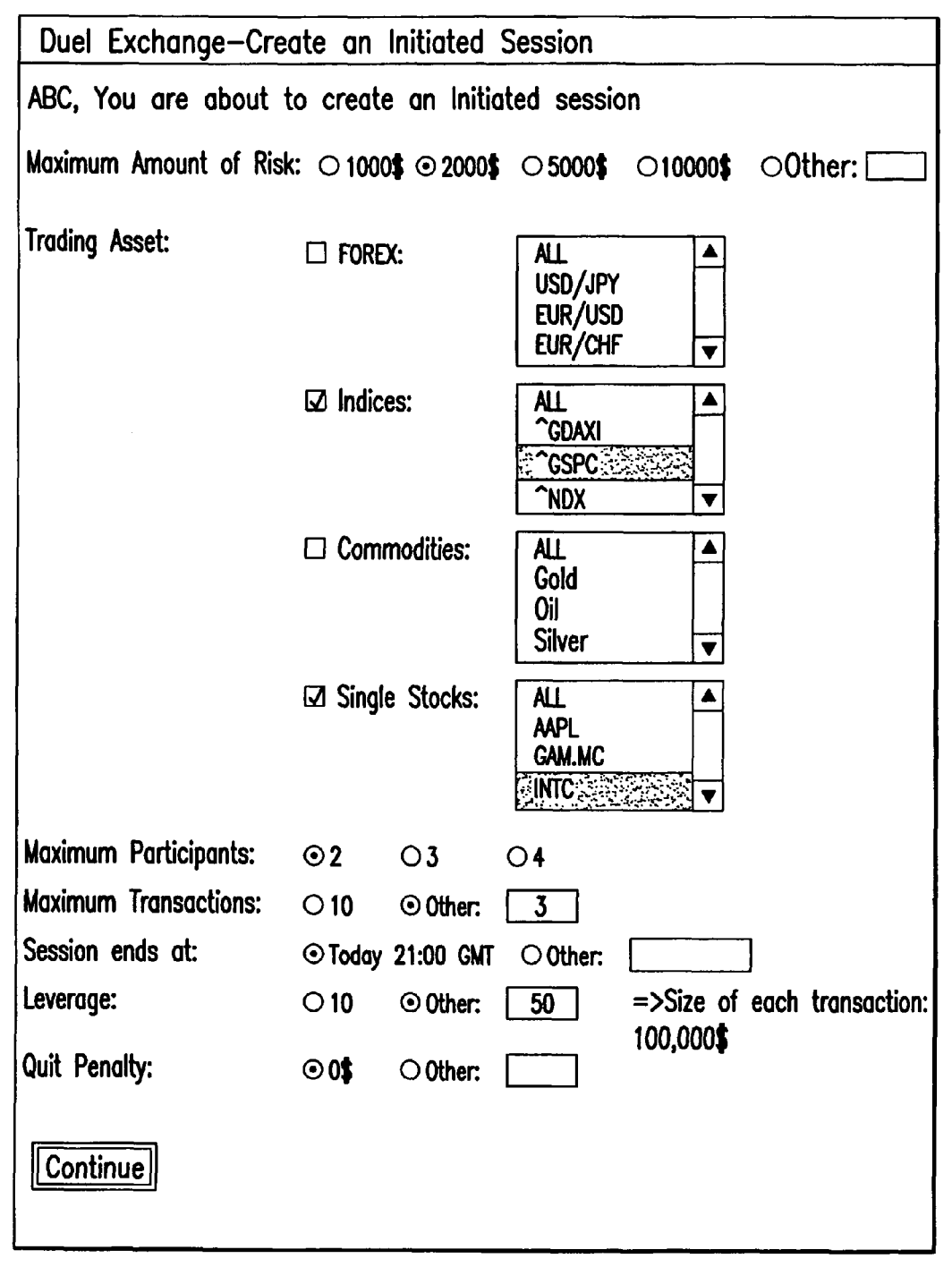

In response to ABC clicking on the "Confirm" button seen in FIG. 19, the window shown in FIG. 20 appears on ABC's display screen. To create an initiated session, ABC must perform the following steps. First, ABC must select the maximum amount of risk he/she wishes to take during the trading session. ABC may select any one of the four standard maximum amounts of risk to be taken on at the outset of the trading session, previously described in connection with the standard session, or ABC may click on the "Other" button and then enter a different monetary value in the "Other" field. In the example depicted in FIG. 20, ABC has clicked on the button associated with $2,000 to indicate the maximum amount of money he/she is willing to risk in the trading session. Second, ABC must select one or more of four standard trading categories, each category including assets of a respective type. In the example depicted in FIG. 20, the user has clicked on the button associated with indices and the button associated with single stocks. Third, ABC must select which trading asset in each selected trading category the user wishes to trade during the session by clicking on one of one of the listed items for each selected trading category. In the example depicted in FIG. 20, the user has elected to trade the S&P 500 index (^GSPC) and stock of Intel Corporation (INTC). Fourth, ABC must select the maximum number of participants. In the example depicted in FIG. 20, ABC has set the maximum number of participants at two. Fifth, ABC must select the maximum number of transactions during the session. In the example depicted in FIG. 20, ABC has set the maximum number of transactions at 3. Sixth, ABC must select the time at which the session will end. Because most exchanges in the U.S.A are closed at 21:00 GMT, the default ending session time is 21 GMT today, but the participant can change it to some days and to trade after hours. Seventh, ABC must select the amount of leverage desired. The default leverage is 10. In the example depicted in FIG. 20, ABC has selected leverage of 50. Since the maximum amount of risk is $2,000 and the leverage is 50, this means that the size of each transaction will be $100,000. (If ABC loses 2% as a result of his/her first transaction, he/she will lose all the money at risk). Lastly, ABC must decide whether there will be a penalty levied on a participant who quits the session and, if so, the amount of the quit penalty. The quit penalty is an additional option available in initiated sessions. The default quit penalty is 0, which enables participants to quit sessions without penalty, but some participants will prefer to punish other participants that decided to quit without one of the stopping events occurring. (Stopping events: the end time has arrived, the maximum number of transactions has been reached, the difference between participants' balances has reached the limit allowed, or the balance in the session of one of the participants has reached zero). After making his/her selections, ABC must click on the "Continue" button in order to continue to the next stage.

In response to clicking on the "Continue" button on the Create an Initiated Session window, ABC is presented with terms of the agreement governing the trading session, as shown in FIG. 21. ABC can accept the terms of the agreement by clicking on "I Agree". The terms of the specific agreement governing the session created by ABC include confirmation of the ABC's selections and an indication that the size of each transaction will be $100,000 in play (i.e., not real) money (i.e., 50 times the maximum amount of real money at risk). The agreement also states under what circumstances the trading session will be terminated, which circumstances are the same as those for the standard session. As further stated on the screen shown in FIG. 21, in order to open the session, the participant who created the session must wait until another participant joins the session. The session will expire if no one joins the session within an hour. The trading platform will send an e-mail to ABC informing him/her that the session he/she created has expired.

After the initiated session has been created by ABC, another person having the identifier "Shark" may choose to participate in an initiated session using a computer located at a site remote from ABC's location. To join an initiated trading session, Shark must first login and then click on the "Start Trading" button displayed on the screen of his computer. In response to Shark electing to start trading, the window shown in FIG. 22 appears on Shark's display screen. This window again includes the same column of virtual buttons on the far left-hand side of the window as previously seen in FIG. 19. In the example depicted in FIG. 22, Shark has decided to join an initiated session by clicking on the button designated "Join Initiated Session". In response to Shark also clicking on the "Confirm" button, the screen shown in FIG. 23 will appear on Shark's display screen.

Figure 23:

As seen in FIG. 23, Shark is presented with a list of initiated sessions that have been created and are not yet expired. The list includes various columns displaying the following information for each session listed: (1) the maximum amount of risk; (2) the identifier of the person who created the session; (3) the trading category; (4) the assets to be traded; (5) the maximum number of participants; (6) the maximum number of transactions; (7) the amount of leverage; (8) the quit penalty; and (9) the time remaining before the session will expire. In the example depicted in FIG. 23, Shark has chosen to join the initiated session created by ABC. Because there were 52 minutes remaining before expiration of the session, this means that ABC had been waiting 8 minutes since creating the session. In response to clicking on the session created by ABC and then clicking on the "Continue" button, all of the terms of the initiated session created by ABC are displayed and Shark is asked to agree to those terms. After Shark has clicked on the "I Agree" box, the display screen will indicate that the session will begin in 30 seconds. The trading platform also sends an e-mail to ABC with a breaking news announcement that the session is going to start.

FIG. 24 is a screen shot showing how the initiated session is managed from the viewpoint of ABC. ABC is updated how much time is left until the end of the session, how many transactions he/she has made, what his/her balance in the session is, how many transactions Shark has made, what Shark's balance is and what the difference in their respective balances is. The screen shot also displays all of the respective positions for both participants. In the example depicted in FIG. 24, there has only been one transaction since the start of the session, namely, at time 20:29:00 Shark sold (short) $100,000 of Intel stock (INTC) at a rate 20.00. Accordingly, the screen indicates that Shark has an open long position.

In the example depicted in FIG. 24, the current rate for the INTC trading asset is 20.10, resulting in a potential loss of −$500.00 for Shark. The screen also indicates that the current rate for the trading asset ^GSPC is 1230.00. As previously described, the current rates of the trading assets are received as streaming data from an information source such as a known exchange or Bloomberg. There is no spread in the trading platform. The rate is the average between the best Bid price and the best Ask price. As a result of Shark's potential loss, the difference in the respective balances of the participants is +$500.00 in ABC's favor. As indicated at the bottom of the screen shown in FIG. 24, ABC can quit the session (by clicking on the "Quit Session" button) because ABC does not have an open transaction.

ABC has the option of either buying or selling either the INTC or the ^GSPC asset. ABC can see that Shark went short on INTC and decides to buy the ^GSPC asset at the rate of 1230.00, the total purchase price being $100,000. In response to ABC clicking on the "Buy" button associated with the ^GSPC asset, a Buy (Long) window pops up on the display screen. ABC can confirm the transaction by clicking on the "Yes" button in the Buy (Long) window.

Figure 25:
Figure 27:
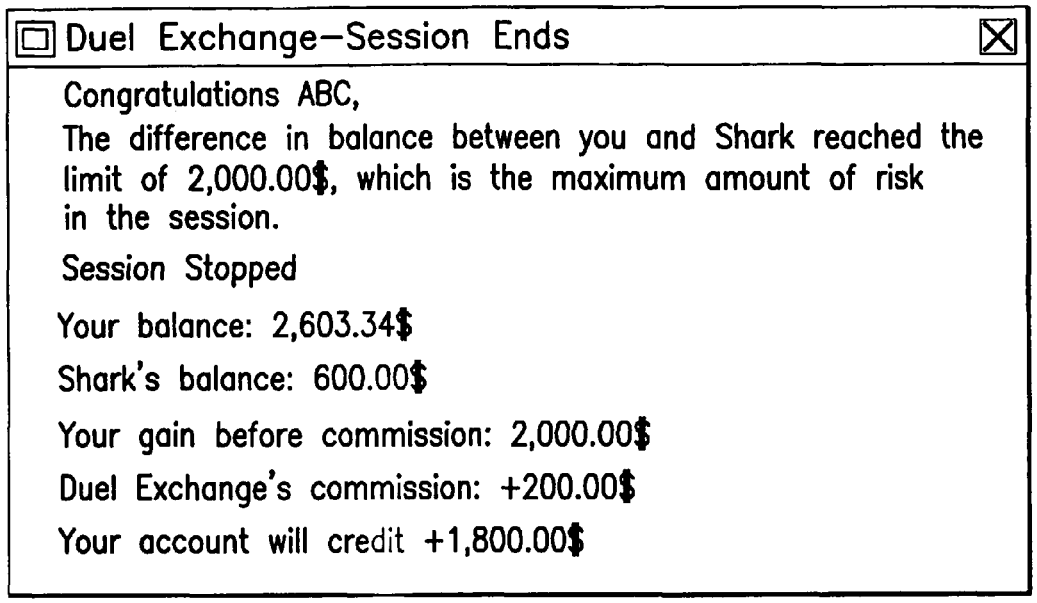
Figure 28:
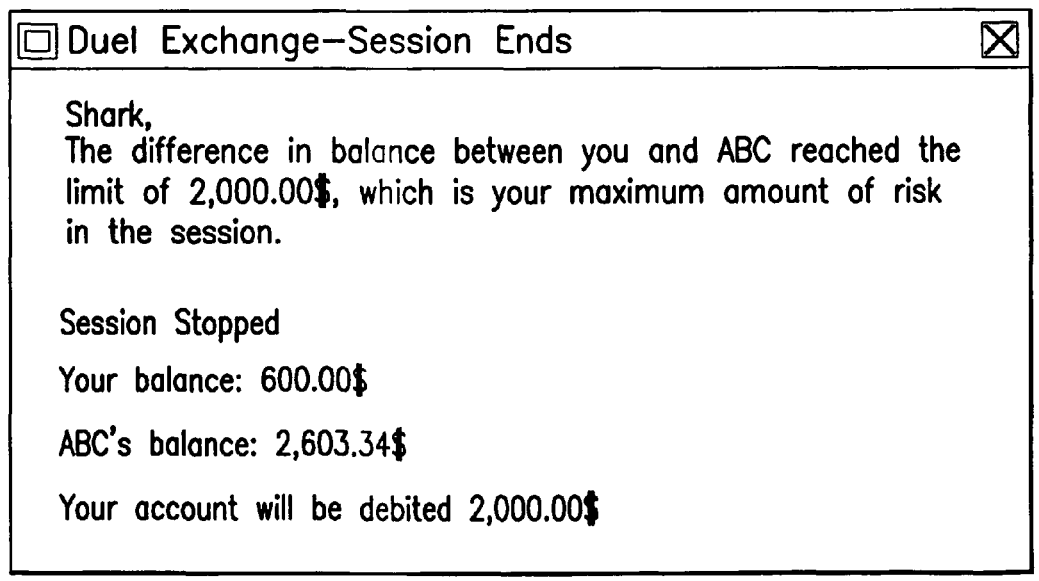
FIG. 28 is a schematic screen shot showing a screen or window viewed by participant Shark after the initiated trading session has been automatically stopped in accordance with one embodiment of the invention.

FIG. 25 shows the same Managing Session screen as seen by ABC but at a later time, i.e., after ABC bought the ^GSPC index as seen in FIG. 24. The Managing Session screen in FIG. 25 indicates that the current rate for INTC stock is 20.20 while the current rate for the ^GSPC index is 1233.00. The respective current positions of the participants in this session are also listed. Because ABC now has an open position, the display screen now includes a "Close" button which ABC can click on in order to close his/her open position. The time of each transaction is indicated along with other details of the respective transactions, including the open price or rate for each transaction. In the example depicted in FIG. 25, the ^GSPC index increased in value after ABC went long at Time 20:29:38, from 1230.80 to 1233.00. As a result ABC has a current gain of $243.90 for that position (3/1230×$100,000=0.2439%). Conversely, Shark's potential loss has increased from −$500.00 to −$1,000.00. As a result, the current difference in the respective balances of the participants is +$1,243.90 in ABC's favor.

As seen in FIG. 25, ABC decides to buy INTC stock at the rate of 20.20, the total purchase price again being $100,000. (Actually in buying INTC for $100,000, ABC purchases virtually 4950.495 units of INTC.) In response to ABC clicking on the "Buy" button associated with the INTC asset, again a Buy (Long) window pops up on the display screen. ABC can confirm the transaction by clicking on the "Yes" button in the Buy (Long) window.

FIG. 26 shows the same Managing Session screen as seen by ABC but at a still later time, i.e., after ABC bought the ^GSPC index as seen in FIG. 25. The Managing Session screen in FIG. 26 indicates that the current rate for INTC stock is 20.28 while the current rate for the ^GSPC index is 1232.55. The respective current positions of the participants in this session are again listed. In the example depicted in FIG. 26, the ^GSPC index decreased in value from 1233.80 (see FIG. 25) to 1232.55, while the INTC stock increased in value from 20.20 (see FIG. 25) to 20.28. As a result of these positions, ABC has respective current gains of $207.31 for the ^GSPC index and $396.03 for INTC stock. Conversely, Shark's potential loss has increased from −$1,000.00 to −$1,400.00. As a result, the current difference in the respective balances of the participants is above $2,000, which is the maximum amount of risk for this trading session. Consequently, the session is stopped. No further transactions can be made by either participant.

In response to stoppage of the session, a Sessions Ends window appears on ABC's display screen. The Session Ends window displays the respective balances of the participants, ABC's potential gain before commission ($2,000.00), the amount of commission (10% of $2,000.00=$200.00) to be paid by ABC to the trading platform, and the gain less commission to be credited to ABC's account ($1,800.00). Conversely, a Session Ends window also appears on Shark's computer screen in response to session stoppage, which window (see FIG. 28) indicates that Shark's account with the trading platform will be debited by $2,000.00 as a result of Shark's participation in the initiated trading session created by ABC.

Figure 29:
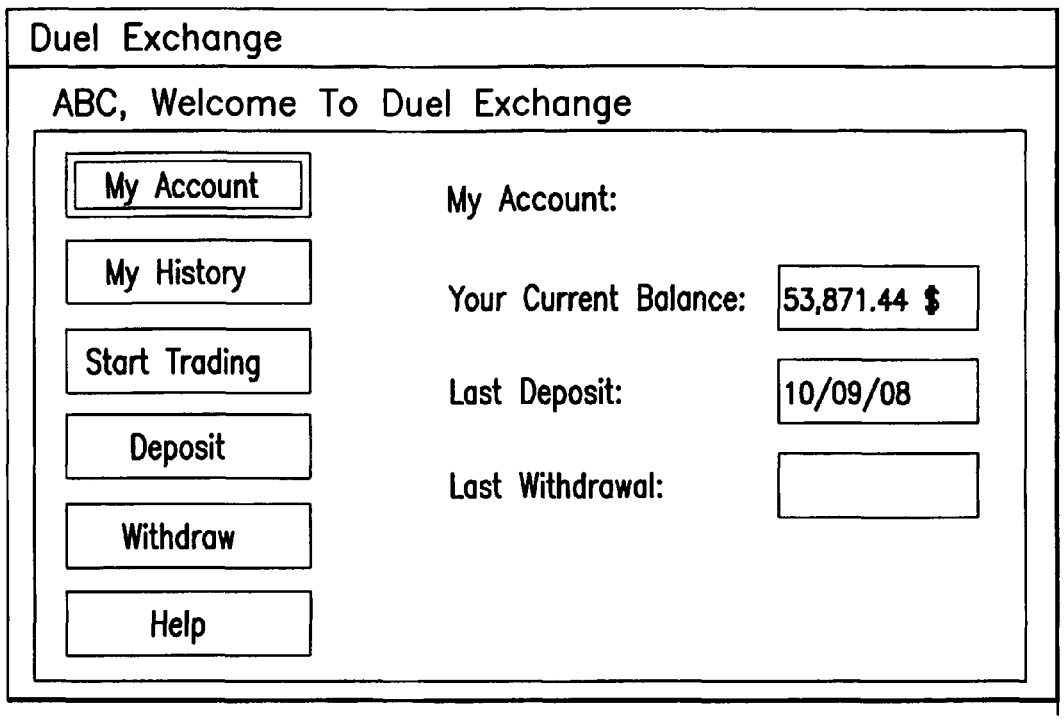
FIG. 29 is a schematic screen shot showing a screen or window viewed by participant ABC after the initiated trading session created by ABC has been stopped in accordance with one embodiment of the invention. The screen or window shows a current balance in ABC's account that reflects the results of both the standard and the initiated trading sessions created by ABC.

After winning in his/her trading competition with Shark, ABC can check his/her account balance in the trading platform by returning to the window previously shown in FIG. 18. As seen in FIG. 29, ABC's current balance is now $53,871.44, which includes the previous balance of $52,071.44 and $1,800.00 won from Shark.

Figure 30:
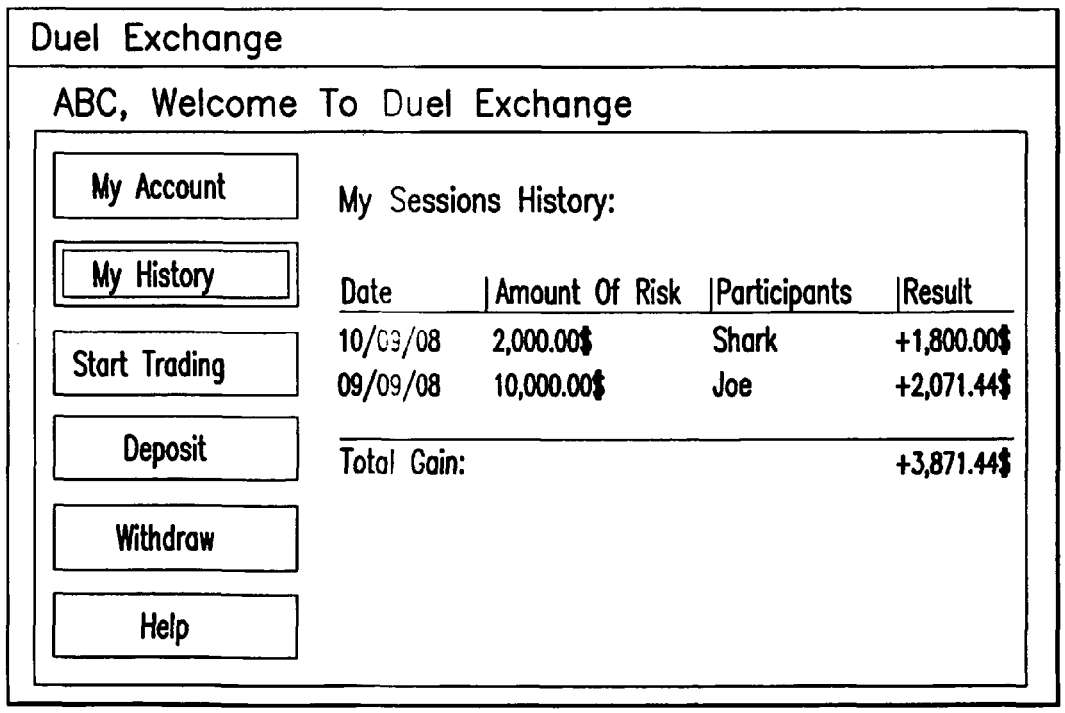
FIG. 30 is a schematic screen shot showing a screen or window viewed by participant ABC after the initiated trading session created by ABC has been stopped in accordance with one embodiment of the invention. The screen or window shows a history of results for all trading sessions in which in ABC has participated.

Finally, by clicking on the "My History" on the screen seen in FIG. 30, ABC can see his/her trading sessions history. ABC can see that he/she gained $1800.00 from the session with Shark and $2071.44 from the session with Joe. The total gain is $3871.44.

The trading platform disclosed herein provides numerous benefits and has numerous advantageous features:

(a) A participant can have a gain even if all his/her transactions during a session result in losses, provided that his/her rival has lost more money during the same session.

(b) In the known trading world (especially involving foreign currency) fluctuations can be sharp and can cause deep losses for traders very quickly. The fact that a trader pays a spread or commission in the regular trading world diminishes his/her chances of having a gain for a given transaction. In the trading method disclosed herein, participants will be influenced by the status of their rivals and will not pay a commission for every transaction. These advantages might enable participants to moderate their risks (c) Participants will compete against other participants and can choose different types of sessions (initiated or standard). Participants can avoid direct competition against professional banks and financial institutions as happens in the regular trading world, thereby having a better chance to earn money.

(d) The trading platform disclosed herein offers an innovative service to its clients, which service combines competition and fun.

(e) The trading platform disclosed herein will encourage participants to execute more transactions with lower commissions. The participants do not pay commission for each transaction, but rather only the winner pays a part of his profits to the platform provider after the session (involving multiple transactions) has ended. This will enable trading platforms to attract more participants. More participants means more profits for the platform provider.

(f) The trading method disclosed herein can also be used for practice and learning. The trading platform disclosed herein will enable participants to compete against each other by trading with virtual money, not real money. The experience gained during virtual trading could be applied in real trading.

(g) The trading platform disclosed herein will enable developers of computerized trading strategies to test their software against professional traders or to test the performance of their software against other program trading strategies.

(h) The trading platform disclosed herein allows participants to limit their losses. This trading system matches participants into categories so that each one is risking the an affordable amount of money, not playing against the market, therefore should the market collapse and these individual traders loose. It will be affordable to them and within their means. They may stop the trade, and are not asked to add margins to the transaction. In the worst case scenario, all of them a present stop loss position regardless how highly leveraged they are.

(i) In the case of a real financial crisis, the competitive virtual trading facilitated by the trading platform disclosed herein would not affect the financial community because the trade is liquidated as agreed or the loser is exposed to the maximum loss only. The loser is not required to add more money to hold a margin position. Therefore a global financial crisis could not affect the trading.

(j) The competitive virtual trading facilitated by the trading platform disclosed herein will also enable trading on products for which the real market requires a minimum size per transaction. Therefore a small investor can enter such product markets.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

For example, although the embodiments disclosed herein envision the trading platform as residing at a server which serves two or more clients via a network (see FIG. 1), a person skilled in the art will appreciate that software could be installed on the computers to be used by participants that would enable those to communicate with each other, receive streaming price quote data from a source, and manage each trading session, while the server can keep all the data about the history of the participants and their updated balances. The calculation of the session account balances of the participants can be managed at the server or at the client computers.

The use of alphabetic letters to designate steps in a method claim hereinafter should not be construed as requiring that the steps be performed in the order in which they are recited.

The invention claimed is:

1. An automated method for facilitating competitive virtual trading of assets comprising the following operations executed by a computer:
   (a) storing first and second monetary values in respective first and second trading accounts of first and second participants, said first and second monetary values representing respective amounts of money deposited by said first and second participants;
   (b) setting a risk parameter for a trading session, said risk parameter being a third monetary value representing a maximum amount of money that will be risked by each of said first and second participants during said trading session, said third monetary value being less than or equal to each of said first and second monetary values;
   (c) determining a current price for each asset eligible to be virtually traded during said trading session, each current price of an eligible asset being determined as a function of a current price quotation in effect during actual trading of the eligible asset on an exchange;
   (d) sending each determined current price for each eligible asset to both of said first and second participants during said trading session;
   (e) accepting buy and sell orders from said first and second participants for the virtual purchase and sale of respective quantities of eligible assets during said trading session, each order involving a respective quantity of a selected one of said eligible assets having a preset monetary value that is greater than said third monetary value by a leverage factor, wherein each order placed is filled at the asset price current at the time when the order is placed;
   (f) after each change in the price of any asset held by either of said first and second participants during said trading session, computing a difference between the sum of all gains and losses achieved by said first participant and the sum of all gains and losses achieved by said second participant;
   (g) stopping said trading session; and
   (h) crediting said first trading account by an amount equal to the difference between the sum of all gains and losses achieved by said first participant and the sum of all gains and losses achieved by said second participant during said trading session less a commission and debiting said second trading account by an amount equal to said difference.

2. The method as recited in claim 1, further comprising the following operations executed by said computer:
   after each change in the price of any asset held by said first participant, computing the sum of all gains and losses achieved by said first participant as a result of all orders accepted from said first participant since the start of said trading session, each gain or loss being the product of a percentage change in the price of the asset bought or sold by said first participant and said preset monetary value; and
   after each change in the price of any asset held by said second participant, computing the sum of all gains and losses achieved by said second participant as a result of all orders accepted from said second participant since the start of said trading session, each gain or loss being the product of a percentage change in the price of the asset bought or sold by said second participant and said preset monetary value.

3. An automated method for facilitating competitive virtual trading of assets comprising the following operations executed by a computer:
   (a) establishing first and second accounts in a database for first and second participants respectively;
   (b) storing a first monetary value in said first account, said first monetary value representing an amount of money deposited by said first participant;
   (c) storing a second monetary value in said second account, said second monetary value representing an amount of money deposited by said second participant;
   (d) setting a risk parameter for a trading session, said risk parameter being a third monetary value representing a maximum amount of money that will be risked by each of said first and second participants during said trading session, said third monetary value being less than or equal to said first monetary value;
   (e) determining a current price for each asset eligible to be virtually traded during said trading session, each current price of an eligible asset being determined as a function of a current price quotation in effect during actual trading of the eligible asset on an exchange;
   (f) sending each determined current price for each eligible asset to both of said first and second participants during said trading session;
   (g) accepting buy and sell orders from said first participant for the virtual purchase and sale of respective quantities of eligible assets during said trading session, each order involving a respective quantity of a selected one of said eligible assets having a preset monetary value that is greater than said third monetary value by a leverage factor, wherein each order placed by said first participant is filled at the asset price current at the time when the order is placed by said first participant;
   (h) accepting buy and sell orders from said second participant for the virtual purchase and sale of respective quantities of eligible assets during said trading session, each order involving a respective quantity of a selected one of said eligible assets having a preset monetary value that is greater than said third monetary value by a leverage factor, wherein each order placed by said second participant is filled at the asset price current at the time when the order is placed by said second participant;
   (i) after each change in the price of any asset held by either of said first and second participants during said trading session, computing a difference between the sum of all gains and losses achieved by said first participant and the sum of all gains and losses achieved by said second participant;
   (j) stopping said trading session; and
   (k) crediting said first trading account by an amount equal to the difference between the sum of all gains and losses achieved by said first participant and the sum of all gains and losses achieved by said second participant during said trading session less a commission and debiting said second trading account by an amount equal to said difference.

4. The method as recited in claim 3, further comprising the following operations executed by said computer:

after each change in the price of any asset held by said first participant, computing the sum of all gains and losses achieved by said first participant as a result of all orders accepted from said first participant since the start of said trading session, each gain or loss being the product of a percentage change in the price of the asset bought or sold by said first participant and said preset monetary value; and after each change in the price of any asset held by said second participant, computing the sum of all gains and losses achieved by said second participant as a result of all orders accepted from said second participant since the start of said trading session, each gain or loss being the product of a percentage change in the price of the asset bought or sold by said second participant and said preset monetary value.

5. The method as recited in claim 3, further comprising the operation of computing a commission, said commission being a percentage of the difference at the end of said trading session.

6. The method as recited in claim 3, wherein said trading session is stopped at any time when the difference between the sum of all gains and losses achieved by said first participant and the sum of all gains and losses achieved by said second participant equals or exceeds said third monetary value.

7. The method as recited in claim 3, wherein said trading session is stopped at a preset time or in response to a quit request from either of said first and second participants.

8. The method as recited in claim 3, wherein said trading session is stopped in response to the balance in the session account of either participant reaching zero.

9. The method as recited in claim 3, wherein a communication, comprising data representing said third monetary value, is received from said first participant prior to the start of said trading session.

10. The method as recited in claim 3, wherein a communication, comprising data identifying the assets eligible for trading during said trading session, is received from said first participant prior to the start of said trading session.

11. The method as recited in claim 3, wherein a communication indicating an agreement to abide by a particular set of rules characterizing said trading session is received from said first participant prior to the start of said trading session.

12. The method as recited in claim 11, wherein a communication indicating an agreement to join said trading session and abide by said particular set of rules is received from said second participant after said agreement-indicating communication from said first participant is received and prior to the start of said trading session.

13. The method as recited in claim 3, wherein a communication, comprising data representing said leverage factor, is received from said first participant prior to the start of said trading session.

14. The method as recited in claim 3, wherein each current price of an eligible asset is determined as a function of current Bid and Ask price quotations in effect during actual trading of said eligible asset on an exchange.

15. The method as recited in claim 3, wherein each buy or sell order received from said first and second participants is counted as a transaction, each of said first and second participants being prevented from making any further transactions during said trading session when a maximum number of allowable transactions for a single participant has been reached.

16. The method as recited in claim 15, wherein a communication, comprising data representing said maximum number of allowable transactions, is received from said first participant prior to the start of said trading session.

17. A platform for facilitating competitive virtual trading of assets, comprising a computer having a network interface and a data storage memory, wherein said data storage memory stores first and second monetary values in respective first and second trading accounts of first and second participants, said first and second monetary values representing respective amounts of money deposited by said first and second participants, and said computer is programmed to perform the following operations:

(a) setting a risk parameter for a trading session, said risk parameter being a third monetary value representing a maximum amount of money that will be risked by each of said first and second participants during said trading session, said third monetary value being less than or equal to each of said first and second monetary values;

(b) determining a current price for each asset eligible to be virtually traded during said trading session, each current price of an eligible asset being determined as a function of a current price quotation in effect during actual trading of the eligible asset on an exchange;

(c) sending each determined current price for each eligible asset to both of said first and second participants during said trading session;

(d) accepting buy and sell orders from said first and second participants for the virtual purchase and sale of respective quantities of eligible assets during said trading session, each order involving a respective quantity of a selected one of said eligible assets having a preset monetary value that is greater than said third monetary value by a leverage factor, wherein each order placed is filled at the asset price current at the time when the order is placed;

(e) after each change in the price of any asset held by either of said first and second participants during said trading session, computing a difference between the sum of all gains and losses achieved by said first participant and the sum of all gains and losses achieved by said second participant;

(f) stopping said trading session; and (g) crediting said first trading account by an amount equal to the difference between the sum of all gains and losses achieved by said first participant and the sum of all gains and losses achieved by said second participant during said trading session less a commission and debiting said second trading account by an amount equal to said difference.

18. The system as recited in claim 17, wherein said computer is further programmed to perform the following operations:

after each change in the price of any asset held by said first participant, computing the sum of all gains and losses achieved by said first participant as a result of all orders accepted from said first participant since the start of said trading session, each gain or loss being the product of a percentage change in the price of the asset bought or sold by said first participant and said preset monetary value; and after each change in the price of any asset held by said second participant, computing the sum of all gains and losses achieved by said second participant as a result of all orders accepted from said second participant since the start of said trading session, each gain or loss being the product of a percentage change in the price of the asset bought or sold by said second participant and said preset monetary value.

19. The system as recited in claim 17, wherein said computer is further programmed to perform the step of computing a commission, said commission being a percentage of the difference at the end of said trading session.

20. The system as recited in claim 17, wherein said computer is further programmed to stop said trading session at any time when the difference between the sum of all gains and losses achieved by said first participant and the sum of all gains and losses achieved by said second participant equals or exceeds said third monetary value.

21. The system as recited in claim 17, wherein said computer is further programmed to stop said trading session at a preset time or in response to a quit request from either of said first and second participants.

22. The system as recited in claim 17, wherein said computer is further programmed to stop said trading session in response to the balance in the session account of either participant reaching zero.

* * * * *